United States Patent
Nakajima et al.

(10) Patent No.: US 6,917,449 B2
(45) Date of Patent: Jul. 12, 2005

(54) IMAGE PROCESSING APPARATUS AND METHOD OF THE SAME, AND STORAGE MEDIUM

(75) Inventors: Yasuki Nakajima, Kanagawa-ken (JP); Hisatsugu Tahara, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 10/247,312

(22) Filed: Sep. 20, 2002

(65) Prior Publication Data

US 2003/0020936 A1 Jan. 30, 2003

Related U.S. Application Data

(62) Division of application No. 09/349,202, filed on Jul. 7, 1999, now Pat. No. 6,525,842.

(30) Foreign Application Priority Data

| Jul. 9, 1998 | (JP) | 10-208537 |
| Jul. 9, 1998 | (JP) | 10-208538 |
| Nov. 17, 1998 | (JP) | 10-326399 |

(51) Int. Cl.$^7$ .............................. H04N 1/00
(52) U.S. Cl. .......................... 358/409; 358/448
(58) Field of Search ................ 358/444, 409, 358/404, 1.16, 1.17, 448, 465; 375/204; 365/189.01, 192; 323/212, 283, 284

(56) References Cited

U.S. PATENT DOCUMENTS

| 3,577,132 A | | 5/1971 | Anderson et al. ...... 340/174.1 A |
| 4,577,154 A | * | 3/1986 | Takagi et al. ................ 327/176 |
| 4,679,096 A | | 7/1987 | Nagashima .................. 358/287 |
| 4,996,684 A | | 2/1991 | Morley et al. ........... 370/100.1 |
| 5,164,843 A | | 11/1992 | Swanberg .................... 358/474 |
| 5,166,803 A | | 11/1992 | Sasakura .................... 358/323 |
| 5,191,647 A | * | 3/1993 | Masaki ....................... 345/501 |
| 5,349,449 A | | 9/1994 | Omi et al. ................... 358/448 |
| 5,469,536 A | * | 11/1995 | Blank .......................... 345/594 |
| 5,488,627 A | | 1/1996 | Hardin et al. ............... 375/204 |
| 5,631,920 A | | 5/1997 | Hardin ........................ 375/200 |
| 5,675,717 A | * | 10/1997 | Yamamoto ................... 358/1.9 |
| 5,901,176 A | * | 5/1999 | Lewison ...................... 375/238 |
| 6,294,904 B1 | * | 9/2001 | Hirst ........................... 323/283 |
| 6,510,068 B1 | * | 1/2003 | Bors ............................ 363/163 |
| 6,525,842 B1 | * | 2/2003 | Nakajima .................... 358/409 |
| 6,661,298 B2 | * | 12/2003 | Lye .............................. 331/56 |
| 6,807,313 B1 | * | 10/2004 | Allen et al. ................. 382/254 |
| 6,813,038 B1 | * | 11/2004 | Kadowaki ................... 358/1.18 |
| 6,825,958 B1 | * | 11/2004 | Fukasawa et al. .......... 358/523 |
| 2003/0086004 A1 | * | 5/2003 | Usami ..................... 348/223.1 |

FOREIGN PATENT DOCUMENTS

| EP | 0822422 | * | 2/1998 | ............ G01S/7/52 |
| EP | 0 912 039 A2 | | 4/1999 | |
| JP | 62146066 | | 6/1987 | |
| JP | 6-250755 | * | 9/1994 | ............ G06F/1/04 |
| JP | 09-322108 | | 12/1997 | ............ H04N/1/21 |
| JP | 9322108 | * | 12/1997 | ......... H04N/5/907 |
| JP | 10065910 | | 3/1998 | |
| JP | 10-065910 | * | 3/1998 | ......... H04N/1/393 |
| JP | 10-126595 | | 5/1998 | ............ H04N/1/21 |
| JP | 2000-32189 | * | 1/2000 | ............ H04N/1/00 |

OTHER PUBLICATIONS

Machine Translation of the Akihiro reference.*

* cited by examiner

*Primary Examiner*—Jerome Grant, II
(74) *Attorney, Agent, or Firm*—Fitzpatrick, Cella, Harper & Scinto

(57) ABSTRACT

A clock signal is frequency-modulated and an image processing operation is executed synchronously with the frequency-modulated clock signal to generate image data which is stored in a memory. Image data written in the memory is read synchronously with a clock signal having a fixed frequency. The image data written in the memory synchronously with the frequency-modulated clock signal is therefore converted into the image data synchronizing with the clock signal having a fixed frequency. Data subjected to image processing synchronously with the frequency-modulated clock signal can be output on the recording apparatus side without any practical problem.

24 Claims, 15 Drawing Sheets

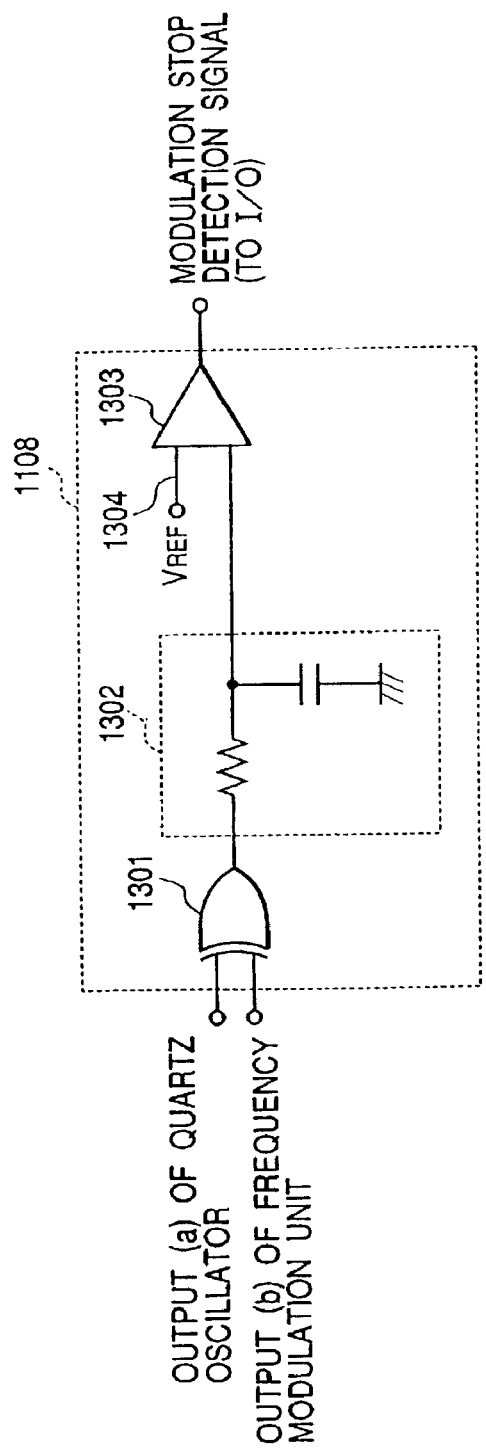
FIG. 13
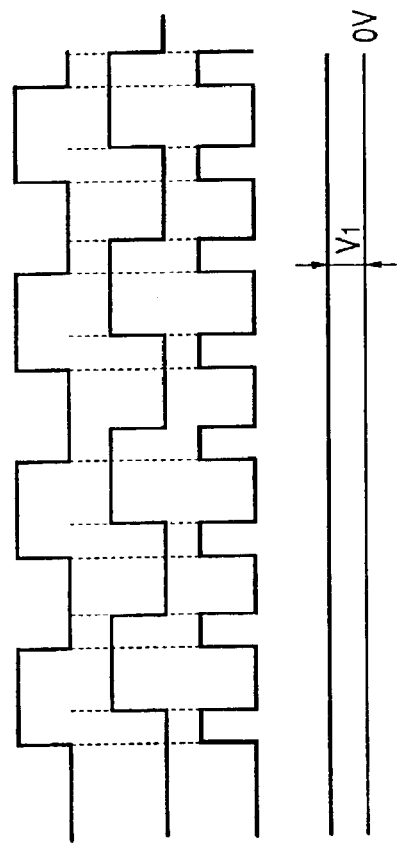
FIG. 14A
FIG. 14B
FIG. 14C
FIG. 14D

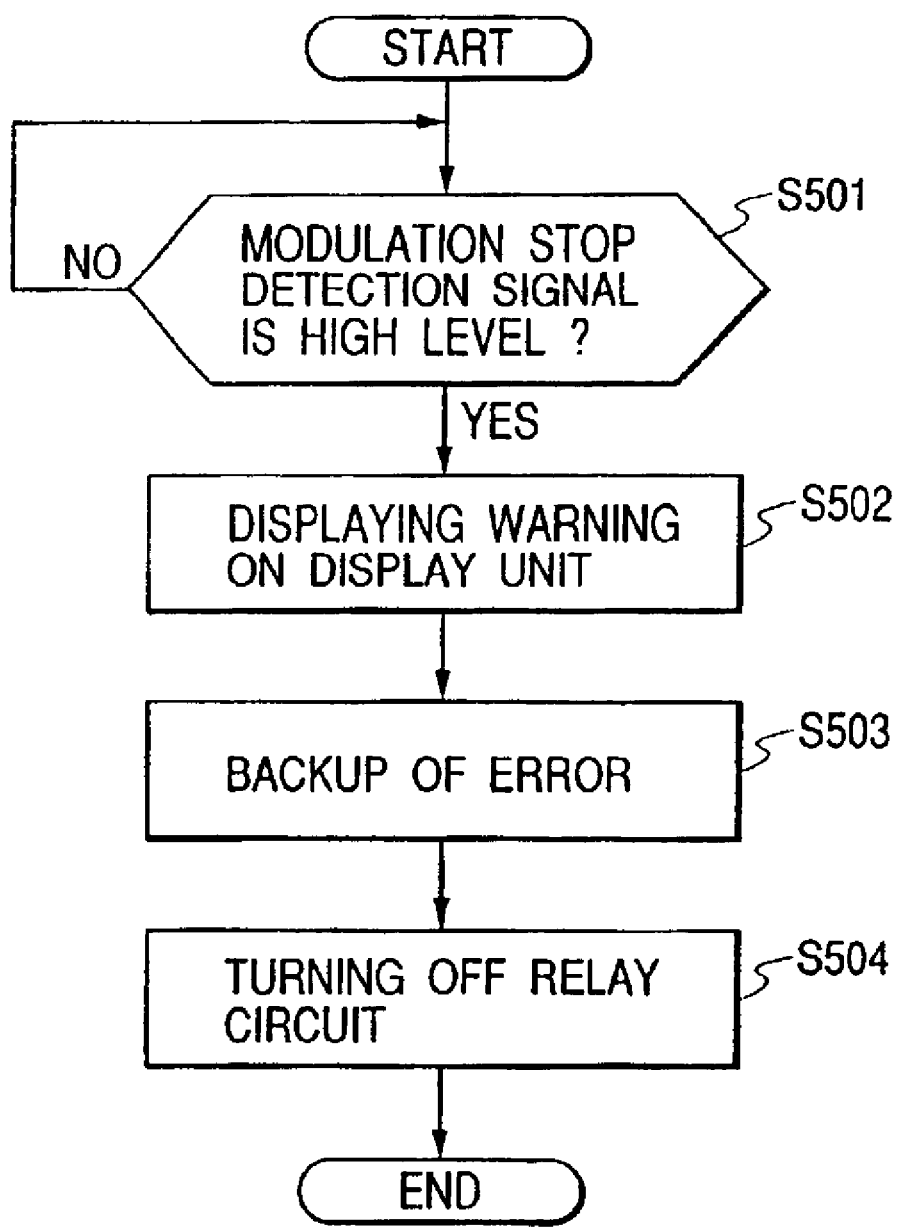

IMAGE PROCESSING APPARATUS AND METHOD OF THE SAME, AND STORAGE MEDIUM

CROSS REFERENCE TO RELATED APPLICATION

This application is a divisional of application Ser. No. 09/349,202, filed Jul. 7, 1999 now U.S. Pat. No. 6,525,842.

BACKGROUND OF THE INVENTION

1. Field of the Invention

The present invention relates to an image processing apparatus and an image processing method, and to a storing medium, and more particularly to an image processing apparatus and method suitable for application to a digital copier, a scanner or the like, and to a storing medium.

2. Related Background Art

An image processing apparatus such as a digital copier and a scanner is known, which reads an image of an original placed on an original support and executes predetermined image processing. In a conventional image processing apparatus, a timing signal is generated in accordance with a clock signal having a fixed frequency generated by a clock signal generation unit such as a quartz oscillator, and synchronously with this timing signal, an original image is read to generate image data which is subjected to various image processing.

With recent high speed and high resolution of sophisticated image processing techniques, the frequency of a clock signal to be used for the image processing by an image processing apparatus is becoming high. On the other hands, regulations on noises radiated from various electronic apparatuses are becoming sever one year after another. If the clock frequency is raised as in recent years, it is predicted that countermeasures against radiation noises of an image processing apparatus become more difficult. In order to meet the specifications of electromagnetic interference (EMI) adopted worldwide, it is necessary to suppress the amount of radiation noises, which results in a smaller degree of design freedom, a larger load upon a designer and a technical person, and a rise of manufacture cost.

As countermeasures against such radiation noises, there is a method of modulating the frequency of a clock signal. However, if image data is processed by using a timing signal generated in accordance with a frequency-modulated clock signal, there occurs a problem that when the processed image data is output on a recording apparatus such as a printer, the size of each dot becomes different. Furthermore, an abnormal operation, if any, of a frequency modulation function cannot be notified to a user.

SUMMARY OF THE INVENTION

It is an object of the present invention to output image data processed synchronously with a frequency-modulated clock signal without any practical problem.

It is another object of the present invention to allow an operator to confirm the operation state of a frequency modulation function.

According to embodiments of the present invention, the following image processing apparatus, image processing method, and storage medium storing program codes for realizing the image processing method are provided.

An image processing apparatus comprises: a modulation circuit for frequency-modulating a clock signal; a memory for storing image data; a write circuit for writing image data in the memory, synchronously with a first clock signal frequency-modulated by said modulation circuit; and a read circuit for reading image data from the memory, synchronously with a second clock signal having a fixed frequency.

An image processing apparatus comprises: an image reading unit for reading an original image; an image processing circuit for subjecting an image signal read with the image reading unit to a predetermined image processing operation; a first clock generation circuit for generating a first clock signal to be used for processing the image signal; a frequency modulation circuit for frequency-modulating the first clock signal output from the first clock generation circuit; a first timing signal generation circuit for generating a first image processing timing signal in accordance with the first clock signal frequency-modulated by the frequency modulation circuit; an image data generation circuit for processing the image signal synchronously with the first image processing timing signal generated by the first timing signal generator circuit to generate image data; a second clock generation circuit for generating a second clock signal; a second timing signal generation circuit for generating a second image processing timing signal in accordance with the second clock signal output from the second clock generation circuit; a write circuit for writing the image data generated by the image data generation circuit in a memory, synchronously with the first timing signal generated by the first timing signal generation circuit; a read circuit for reading image data from the memory, synchronously with the second timing signal generated by the second timing signal generation circuit; and an image processing circuit for processing the image data read from the memory.

An image processing method comprises: a modulation step of frequency-modulating a clock signal; a write step of writing image data in a memory, synchronously with a first clock signal frequency-modulated at said modulation step; and a read step of reading image data from the memory, synchronously with a second clock signal having a fixed frequency.

An image processing method comprises: an image reading step of reading an original image; an image processing step of subjecting an image signal read at the image reading step to a predetermined image processing operation; a first clock generation step of generating a first clock signal to be used for processing the image signal; a frequency modulation step of frequency-modulating the first clock signal generated at the first clock generation step; a first timing signal generation step of generating a first image processing timing signal in accordance with the first clock signal frequency-modulated at the frequency modulation step; an image data generation step of processing the image signal synchronously with the first image processing timing signal generated at the first timing signal generator step to generate image data; a second clock generation step of generating a second clock signal; a second timing signal generation step of generating a second image processing timing signal in accordance with the second clock signal generated at the second clock generation step; a write step of writing the image data generated at the image data generation step in a memory, synchronously with the first timing signal generated at the first timing signal generation step; a read step of reading image data from the memory, synchronously with the second timing signal generated at the second timing signal generation step; and an image processing step of processing the image data read from the memory.

A storage medium storing a program for realizing an image processing method, the method comprises: a modulation step of frequency-modulating a clock signal; a write step of writing image data in a memory, synchronously with a first clock signal frequency-modulated at said modulation step; and a read step of reading image data from the memory, synchronously with a second clock signal having a fixed frequency.

A storage medium storing a program for realizing an image processing method, the method comprises: an image reading step of reading an original image; an image processing step of subjecting an image signal read at the image reading step to a predetermined image processing operation; a first clock generation step of generating a first clock signal to be used for processing the image signal; a frequency modulation step of frequency-modulating the first clock signal generated at the first clock generation step; a first timing signal generation step of generating a first image processing timing signal in accordance with the first clock signal frequency-modulated at the frequency modulation step; an image data generation step of processing the image signal synchronously with the first image processing timing signal generated at the first timing signal generator step to generate image data; a second clock generation step of generating a second clock signal; a second timing signal generation step of generating a second image processing timing signal in accordance with the second clock signal generated at the second clock generation step; a write step of writing the image data generated at the image data generation step in a memory, synchronously with the first timing signal generated at the first timing signal generation step; a read step of reading image data from the memory, synchronously with the second timing signal generated at the second timing signal generation step; and an image processing step of processing the image data read from the memory.

With the above embodiment structures, image data processed synchronously with a frequency-modulated clock signal can be output without any practical problem.

According to other embodiments of the invention, the following image processing apparatus and image processing method are provided.

An image processing apparatus comprises: a clock signal generation circuit for generating a clock signal; a frequency modulation circuit for modulating a frequency of a generated clock signal; and a detection circuit for detecting an operation state of the frequency modulation circuit.

An image processing method comprises: a clock signal generation step of generating a clock signal; a frequency modulation step of modulating a frequency of a generated clock signal; and a detection step of detecting an operation state of frequency modulation.

With the above embodiment structures, the operation state of a frequency modulation function can be confirmed.

Other objects and features of the present invention will become apparent from the following specification and the accompanying drawings.

BRIEF DESCRIPTION OF THE DRAWINGS

FIG. 13 is a circuit diagram of a frequency modulation stop detection unit of the image processing apparatus shown in FIG. 11.

FIGS. 14A, 14B, 14C and 14D show the waveforms of signals at the frequency modulation stop detection unit of the image processing apparatus shown in FIG. 11.

FIG. 15 is a flow chart illustrating a frequency modulation stop detection operation to be executed by the image processing apparatus shown in FIG. 11.

DETAILED DESCRIPTION OF THE PREFERRED EMBODIMENTS

Embodiments of the invention will be described with reference to the accompanying drawings.

Figure 1:
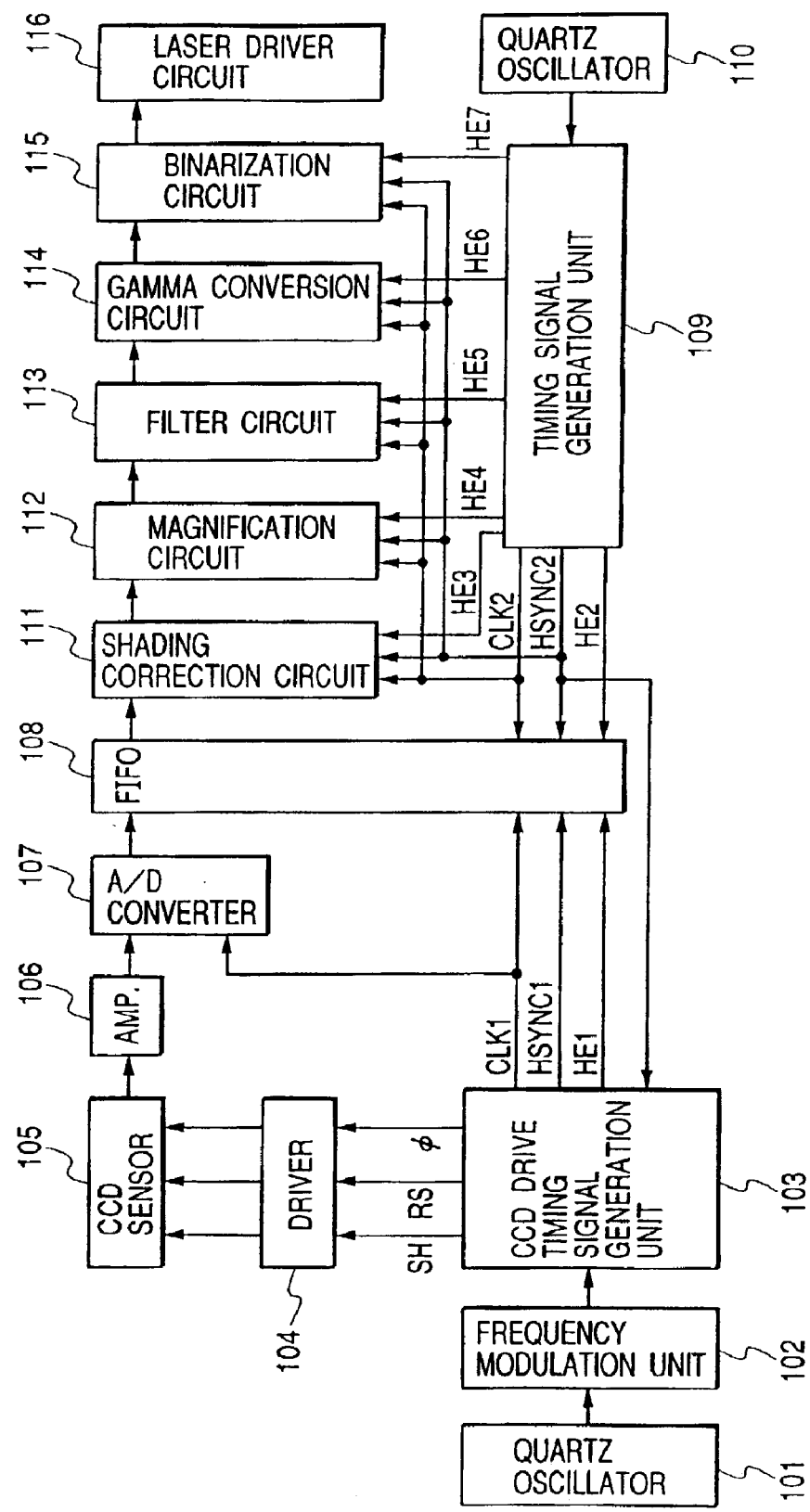
FIG. 1 is a block diagram of an image processing apparatus according to an embodiment of the invention.

FIG. 1 is a block diagram showing an example of an image processing system according to an embodiment of the invention.

In FIG. 1, reference numeral 101 represents a first quartz oscillator which outputs a clock signal having a predetermined frequency.

An output of the first quartz oscillator 101 is supplied to a frequency modulation unit 102. The frequency modulation unit 102 frequency-modulates the input clock signal by a method, for example, disclosed in U.S. Pat. No. 5,488,627 and U.S. Pat. No. 5,631,920.

The clock signal frequency-modulated by the frequency modulation unit 102 is input to a CCD drive timing signal generation unit 103 for generating a drive signal for driving a CCD sensor 105 which reads an image, and for generating other timing signals.

The CCD drive signal generated by the CCD drive timing signal generation unit 103 includes a reset pulse signal RS for resetting charges, a shift pulse signal SH for transferring charges to a shift register, a transfer clock signal φ for transferring changes in the shift register, and other signals. These signals RS, SH and φ are boosted to necessary voltages and currents by the driver circuit 104 and supplied to a CCD sensor 105.

An image signal output from the CCD sensor 105 is an analog signal which is input to an amplifier circuit 106 to be amplified to a signal having an amplitude of, for example, 0 to 5 V. An output of the amplifier circuit 106 is input to an A/D converter to be converted into a digital signal of, for example, 8 bits.

The CCD drive timing signal generator unit 103 also generates a first image clock signal CLK1 which determines a sampling timing for A/D conversion at the A/D converter 107. The image signal A/D converted by the A/D converter 107 is temporarily stored in an image memory 108 structured as a FIFO memory.

The CCD drive timing signal generator unit 103 also generates timing signals necessary for data write into the image memory 108, the signals including a first main scan sync signal HSYNC1, a first main scan effective image section signal HE1 and a first image clock signal CLKl.

A timing signal generator circuit 109 generates timing signals necessary for data read from the image memory 108, synchronously with a clock signal generated by a second quartz oscillator 110, the timing signals including a second main scan sync signal HSYNC2, a second main scan effective image section signal HE2 and a second image clock signal CLK2.

The image signal read from the image memory 108 is first subjected to a variation correction in pixels of the CCD sensor 105 by a shading correction circuit 111, and thereafter subjected to a magnification process by a magnification circuit 112. In this case, for an image compression, a data thinning process is executed, whereas for an image enlargement, a data interpolating process is executed.

Next, a filter circuit 113 emphasizes edges of an image through second order differentiation in a window of, for example, 5×5 pixels, or smoothes the image. Since the image data is luminance data, the image data is converted, for example, into density data in order to print it out at a printer, by a gamma conversion circuit 114 by searching a table.

The image data converted into density data by the gamma conversion circuit 114 is then input to a binarization circuit 115 whereat multi-value data is converted into binary data, for example, by an ED method. The image data binarized by the binarization circuit 115 is input to a laser driver circuit 116.

Each image processing operation at the shading circuit 111, magnification circuit 112, filter circuit 113, gamma conversion circuit 114 and binarization circuit 115 is controlled by the timing signals (second main scan sync signal HSYNC2, second main scan effective image section signals HE3 to HE7, and second image clock signal CLK2) all generated by the timing signal generation unit 109.

Next, the operation of the frequency modulation unit 102 will be described with reference to FIGS. 2 and 3.

Consider first that the frequency of a clock signal generated by the first quartz oscillator 101 is f0.

Figure 2:
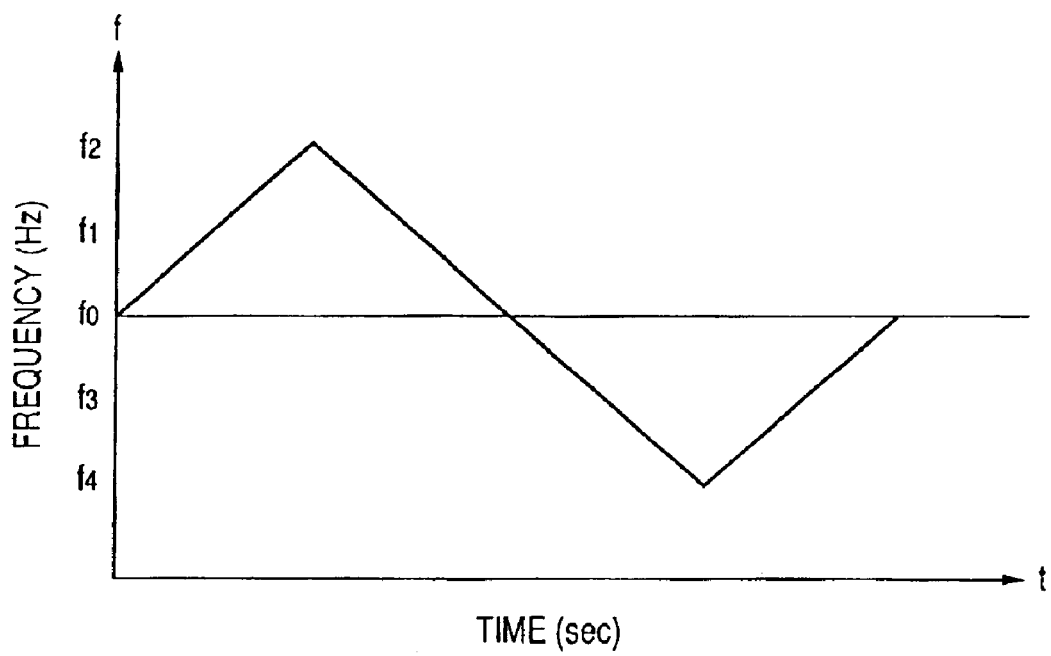
FIG. 2 is a graph illustrating the operation of a frequency modulation unit of the apparatus shown in FIG. 1.

FIG. 2 is a characteristic diagram showing a change in the frequency. In FIG. 2, the ordinate represents frequency and the abscissa represents time. A change in the frequency of a clock signal output from the frequency modulation unit 102 is as in the following.

As shown in FIG. 2, the frequency changes with time in the order of f0→f1→f2→f1→f0→f3→f4→f3→f0, where f4<f3<f0<f1<f2.

A ratio of the highest frequency f2 to the lowest frequency f4 can be changed by the frequency modulation unit 102. For example, if a modulation width is set to f0±0.635%, then f2=1.00635*f0 and f4=0.99365* f0. This frequency modulation operation continues to be repeated.

Figure 3:
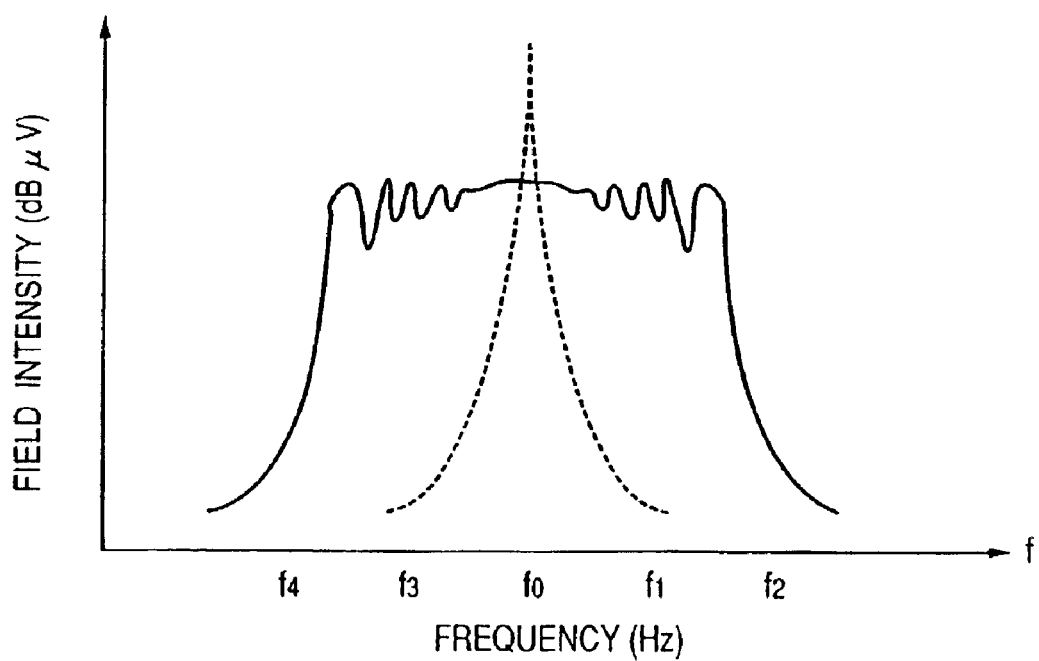
FIG. 3 is a frequency spectrum graph of the frequencies changing as shown in FIG. 2.

The frequency spectra of the output clock signal are shown in the characteristic diagram of FIG. 3. The ordinate represents electric field intensity and the abscissa represents frequency. As shown in FIG. 3, if the frequency is fixed to f0, the spectrum waveform (indicated by a dotted line) is a narrow waveform rising rapidly, whereas if the frequency modulation is performed as shown in FIG. 2, the spectrum waveform (indicated by a solid line) is a wide waveform extending from the frequency f4 to the frequency f2. The peak value of the electric field intensity lowers by about 5 to 10 dB uV when the frequency modulation is performed, so that the amount of noises to be externally radiated can be reduced considerably.

Figure 4:
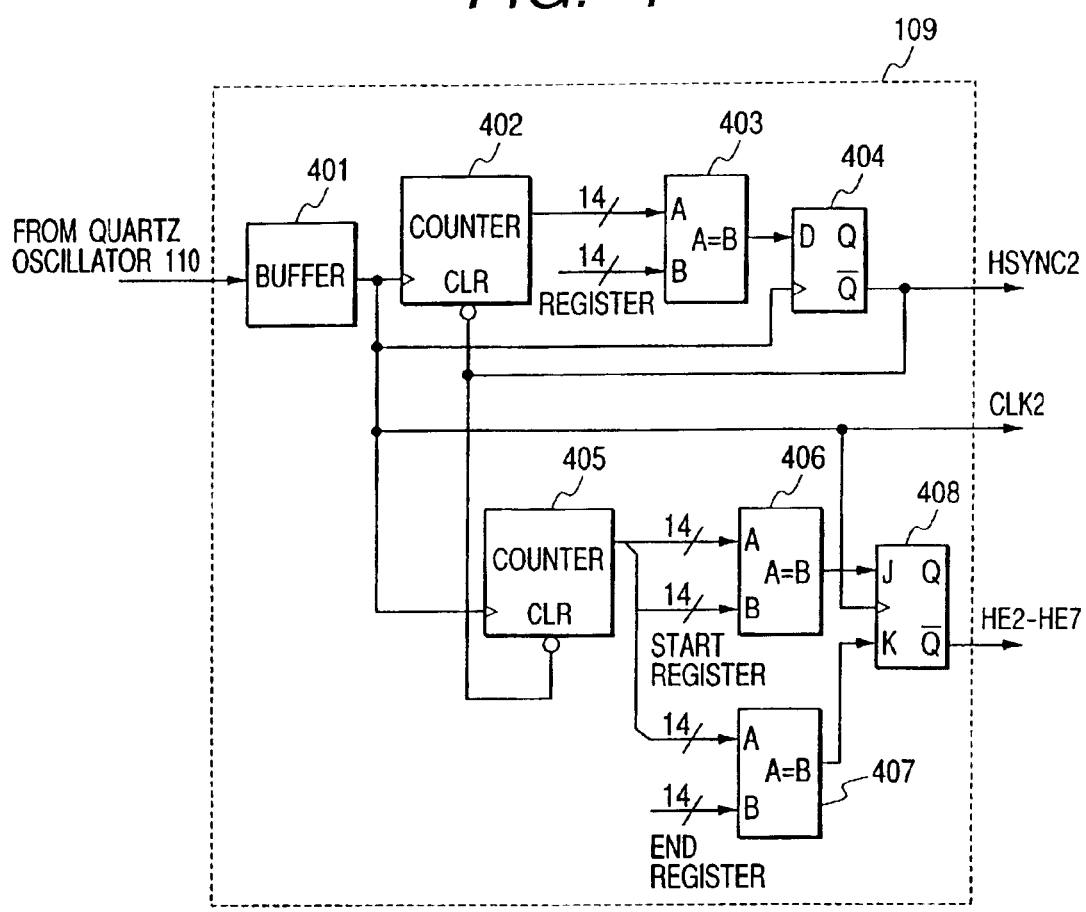
FIG. 4 is a circuit block diagram of a timing generation unit of the apparatus shown in FIG. 1.

FIG. 4 is a block diagram showing the internal structure of the timing generation unit 109. Each image processing operation at the shading circuit 111, magnification circuit 112, filter circuit 113, gamma conversion circuit 114 and binarization circuit 115 is controlled by the timing signals (second main scan sync signal HSYNC2, second main scan effective image section signals HE3 to HE7, and second image clock signal CLK2) all generated by the timing signal generation unit 109.

The clock signal generated by the second quartz oscillator 110 is input to a buffer 401. The clock signal output from the buffer 401 is input to a counter 402 which counts the number of input clock signals and outputs a count of, for example, a 14-bit width.

This count is input to a first input terminal A of a comparator 403. Input to a second input terminal B of the comparator 403 is a value latched by a 14-bit register. This latched value determines the period of the second main scan sync signal HSYNC2. When the count of the counter 402 becomes coincident with the register value (when A=B), the comparator 403 outputs a coincidence signal ("H" level) having one clock width.

The coincidence signal output from the comparator 403 is input to a D input terminal of a D-type flip-flop 404 and latched by the clock signal output from the buffer 401. A negative logic output of the latched coincidence signal becomes the second main scan sync signal HSYNC2. This signal is input to a CLR input terminal of the counter 402 to clear the count thereof.

Figure 5:
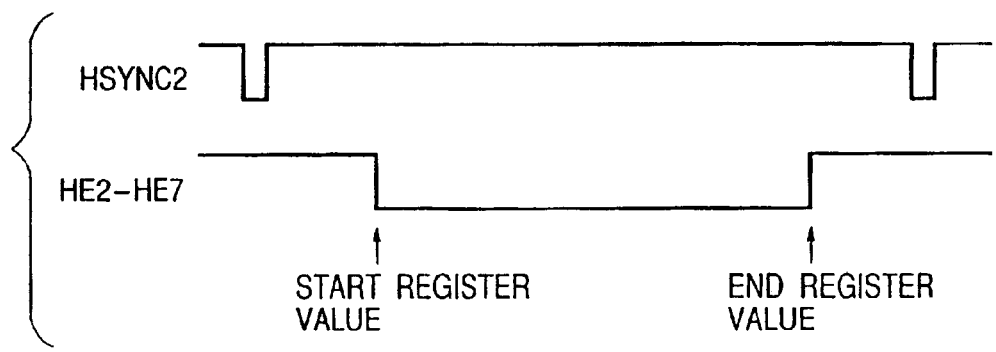
FIG. 5 is a timing chart of signals generated by the timing generation unit of the apparatus shown in FIG. 1.

As shown in FIG. 5, the second main scan sync signal HSYNC2 output from the flip-flop 404 has "L" levels of one pulse width with a period defined by the value of the register.

The clock signal output from the buffer 401 is also input to another counter 405 which counts the number of input clock signals and outputs a count of, for example, a 14-bit width.

This count is input to a first input terminal A of a comparator 406. Input to a second input terminal B of the comparator 406 is a value latched by the 14-bit register. This value determines a start value of the main scan effective image section signal HE2. When the count of the counter 405 becomes coincident with the value in the register, the comparator 406 outputs a coincidence signal ("H" level) having one clock width.

The coincidence signal is input to a J input terminal of a JK-type flip-flop 408 and latched by the clock signal output from the buffer 401. The count of the counter 405 is also input to a first input terminal A of a comparator 407 and a value latched in the 14-bit register is input to a second input terminal B of the comparator 407.

This value determines an end value of the main scan effective image section signal HE2. When the count of the counter 405 becomes coincident with the value in the register, the comparator 407 outputs a coincidence signal ("H" level) having one clock width.

The coincidence signal is input to a K input terminal of the JK-type flip-flop 408 and latched by the clock signal supplied from the butter 401. A negative logic output of the JK-type flip-flop 408 becomes the second main scan effective image section signal HE2.

If the comparators 406 and 407 and JK-type flip-flops 408 are provided as many as the number of necessary main scan effective image section signals, each main scan effective image section signal can be output independently from each other. In this embodiment, signals HE2 to HE7 are generated. As shown in FIG. 5, each of the signals HE2 to HE7 changes to the "L" level at the start register value, and to the "H" level at the end register value. The "L" level section is used as an effective image area and each image processing circuit processes image data during this period.

Figure 6:
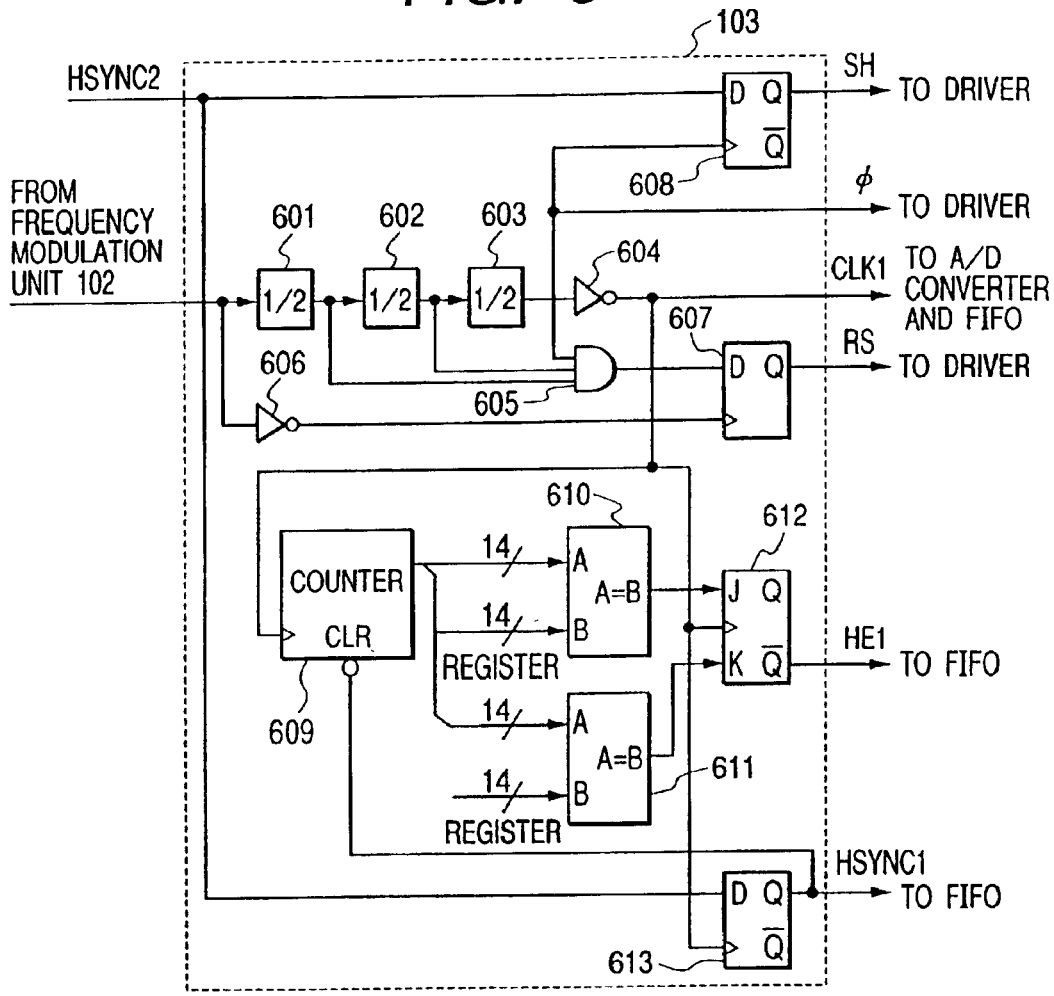
FIG. 6 is a circuit block diagram showing the structure of a CCD drive timing signal generation unit of the apparatus shown in FIG. 1.

FIG. 6 is a block diagram showing the internal structure of the CCD drive timing signal generation circuit 103.

As shown in FIG. 6, the modulated clock signal is input from the frequency modulation unit 102 to the CCD drive timing signal generation circuit 103. The input modulated clock signal is input to a first frequency divider 601 at which the frequency of the clock signal is lowered to ½.

An output of the first frequency divider 601 is sequentially and serially input to second and third frequency dividers 602 and 603. The frequency of the output signal from the third frequency divider 603 is ⅛ of that of the clock signal input to the first frequency divider 601. This output signal is used as the transfer clock signal $\phi$ for transferring charges in the shift register.

The signal output from the third frequency divider 603 is input to a clock input terminal of a D-type flip-flop 608. The second main scan sync signal HSYNC2 is input to a D input terminal of the flip-flop 608. A signal output from an inverted output terminal thereof is output as the shift pulse signal SH to the driver circuit 104.

The signal output from the third frequency divider 603 is also input to an inverter 604 to be inverted. The inverted signal determines the sampling timing for A/D conversion, and becomes the first image clock signal CLK1 which is used as a write sync clock signal for the image memory 108.

Each output from the first to third frequency dividers 601 to 603 is input to a three-input AND gate 605. An output of the three-input AND gate 605 is input to a D input terminal of a D-type flip-flop 607.

As a clock signal for latch timing of the flip-flop 607, the modulated clock signal input from the frequency modulation unit 102 and inverted by the inverter 606 is used.

The latch output of the flip-flop 607 is used as the reset pulse RS for resetting charges of CCD. The shift pulse signal SH for transferring CCD charges to the shift register is a negative logic output of the first main scan sync signal HSYNC1 generated by the timing signal generation unit 102 and latched by the D-type flip-flop 607 by using the clock signal output from the frequency divider 603. The clock signal output from the inverter 604 is input to a counter 609.

The counter 609 counts the number of input clocks and outputs a count having, for example, a 14-bit width. This count is input to a first input terminal A of a comparator 610. A value latched in the 14-bit register is input to a second input terminal B of the comparator 610. This value determines a start value of, the first main scan effective image section signal HE1. When the count of the counter 609 becomes coincident with the register value, the comparator 610 outputs a coincidence signal ("H" level) having one clock width.

The coincidence signal is input to a J input terminal of a JK-type flip-flop 612 and latched by the clock signal output from the inverter 604. The count of the counter 609 is also input to a first input terminal A of a comparator 611.

A value latched in the 14-bit register is input to a second input terminal B of the comparator 611. This value determines an end value of the first main scan effective image section signal HE1. When the count of the counter 609 becomes coincident with the register value, the comparator 611 outputs a coincidence signal ("H" level) having one clock width.

The coincidence signal is input to a K input terminal of the JK-type flip-flop 612 and latched by the clock signal output from the inverter 604. A negative logic output of the JK-type flip-flop 612 becomes the first main scan effective image section signal HE1. This signal is used as a write enable (WE) signal for the image memory 108 of FIFO.

The second main scan sync signal HSYNC2 generated by the timing signal generation unit 109 is input to a D-type flip-flop 613. An output of the flip-flop latched by the clock signal output from the inverter 604 becomes HSYNC1 which is used as a write reset (WRST) signal for the image memory 108 of FIFO.

Each output signal generated by the CCD drive timing signal generation unit 103 is a signal modulated by a predetermined ratio, because the modulated clock signal from the frequency modulation unit 102 is used as the input clock signal.

Figure 7:
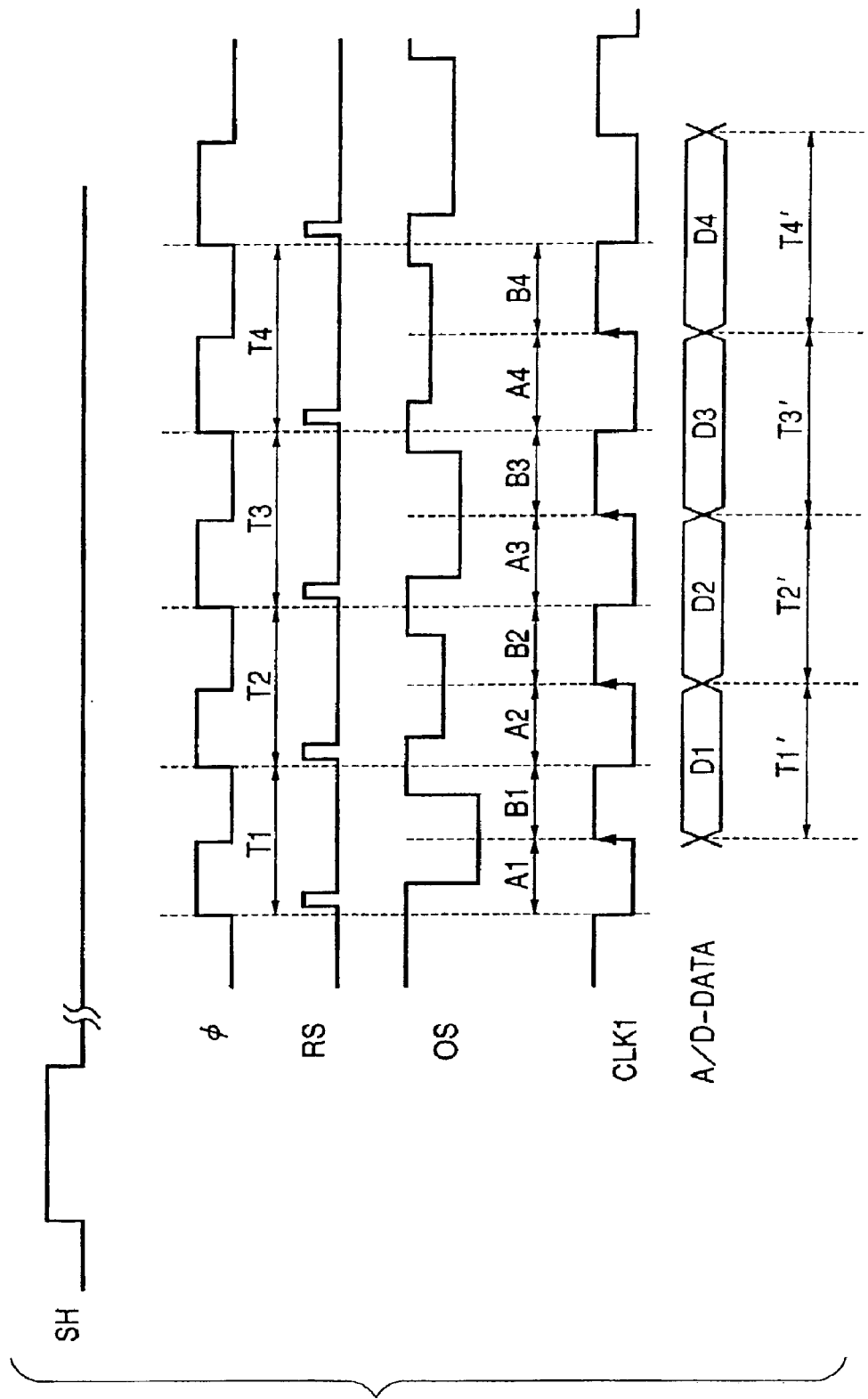
FIG. 7 is a timing chart of signals generated by the CCD drive timing signal generation unit of the apparatus shown in FIG. 1.

FIG. 7 is a timing chart of CCD drive signals and illustrates one main scan operation.

During the "H" level period of the shift pulse signal synchronizing with the main scan sync signal, CCD charges are transferred to the shift register, and an output signal OS is transferred from CCD one pixel after another in response to the transfer clock signal $\phi$.

Since the transfer clock signal $\phi$ is frequency-modulated, its period changes in the order of T1→T2→T3→T4 as shown in FIG. 7. The pixel reset pulse RS generated synchronously with the leading edge of the transfer clock $\phi$, CCD output signal OS, and A/D conversion sampling signal also change their period similar to the transfer clock signal $\phi$.

Therefore, the CCD output signal input to the A/D converter 107 is sampled at the leading edges of the first image clock signal CLK1, so that each pixel is always sampled at the center of one clock period. In the example shown in FIG. 7, ratios of A1:B1, A2:B2, A3:B3, and A4:B4 are constant.

An A/D converted output is output synchronously with the leading edge of the first image clock signal CLK1. Therefore, an image output during the T1 period of the transfer clock signal $\phi$ is D1 and has a period of T1'=B1+A2.

Similarly, the image output during the period T2 is D2 and has a period of T2'=B2+A3.

In this embodiment, although the CCD drive signal is frequency-modulated, image data at the same timing when frequency-modulation is not performed can be sampled.

Next, with reference to FIGS. 8 and 9, read timing of the image memory 108 will be described.

Figure 8:
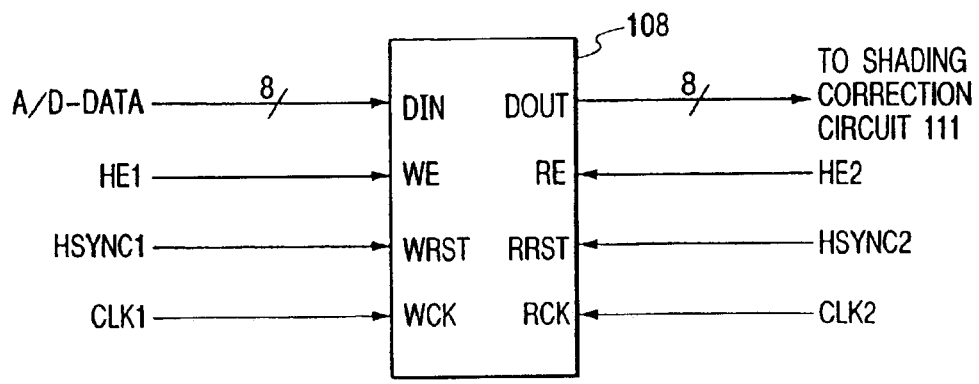
FIG. 8 is a diagram showing signals supplied to an image memory.

FIG. 8 shows signals supplied to the image memory 108. This image memory 108 is a FIFO memory capable of executing data read/write asynchronously.

Signals necessary for data write include a write enable (WE) signal, a write reset (WRST) signal for resetting an internal address counter of the memory, and a write sync clock (WCK) signal. Signals necessary for data read includes a read enable (RE) signal, a read reset (RRST) signal for resetting an internal address counter of the memory, and a read sync clock (RCK) signal.

The signals necessary for data write are HE1, HSYNC1 and CLK1 generated by the CCD drive timing signal generation unit 103. The signals necessary for data read are HE2, HSYNC2 and CLK2 generated by the timing signal generation unit 109. Data to be input to the FIFO memory 108 is data output from the A/D converter 107, and the read data is input to the shading correction circuit 111.

Figure 9:
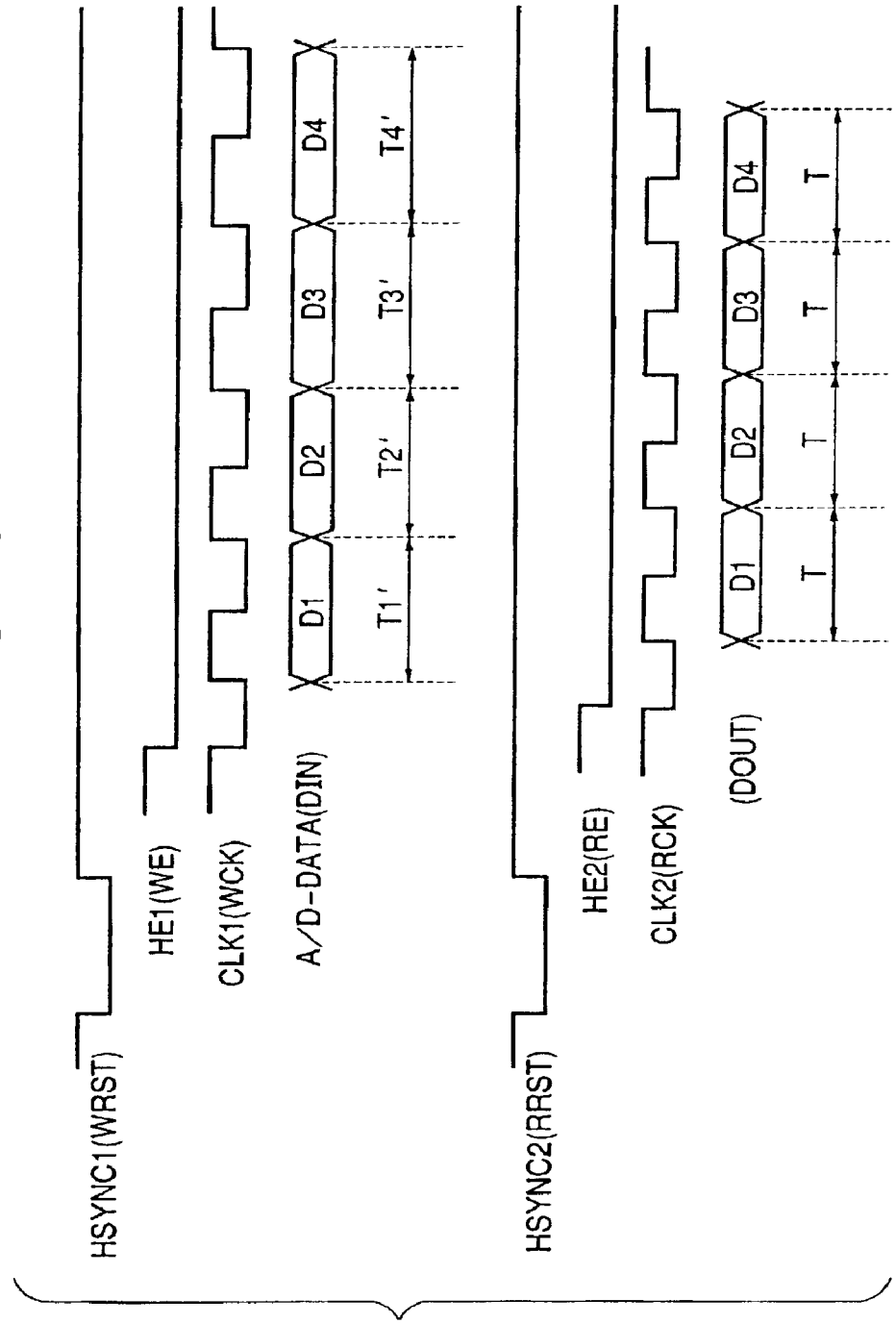
FIG. 9 is a timing chart illustrating the operation of the image memory of the apparatus shown in FIG. 1.

FIG. 9 is a timing chart showing timings of the above-described memory control signals. On the data write side, a write address counter is reset to "0" in response to the HSYNC1 signal.

Thereafter, when the HE1 signal takes the "L" level, the write operation starts. While the write address counter counts up synchronously with the leading edge of the CLK1 signal, input data D1, D2, D3, D4, . . . is sequentially written. The memory control signals are generated by the method described earlier and since the signal CLK1 is frequency-modulated, the period of input data changes in the order of T1', T2', T3', T4', . . . .

On the data read side, the read address counter is reset to "0" in response to the HSYNC2 signal. Thereafter, when the HE2 signal takes the "L" level, the read operation starts. While the read address counter counts up synchronously with the leading edge of the CLK2 signal, data is sequentially read in the order of D1, D2, D3, D4, . . . . The memory control signals are generated by the method described earlier and since the signal CLK2 has a fixed frequency, the period of read data is always constant.

With the read/write operation for the image memory 108 described above, data synchronizing with the frequency-modulated clock signal is converted into data synchronizing with the clock signal having a fixed frequency. In this embodiment, although the image memory 108 is inserted between the A/D converter 107 and shading correction circuit 111, the image memory 108 may be inserted at any image processing position before the data output to the laser driver circuit 116.

In this case, the timing signal is generated synchronously with the frequency-modulated clock signal until data is written in the image memory 108, and thereafter the timing signal is generated synchronously with the clock signal having the fixed frequency.

Figure 10:
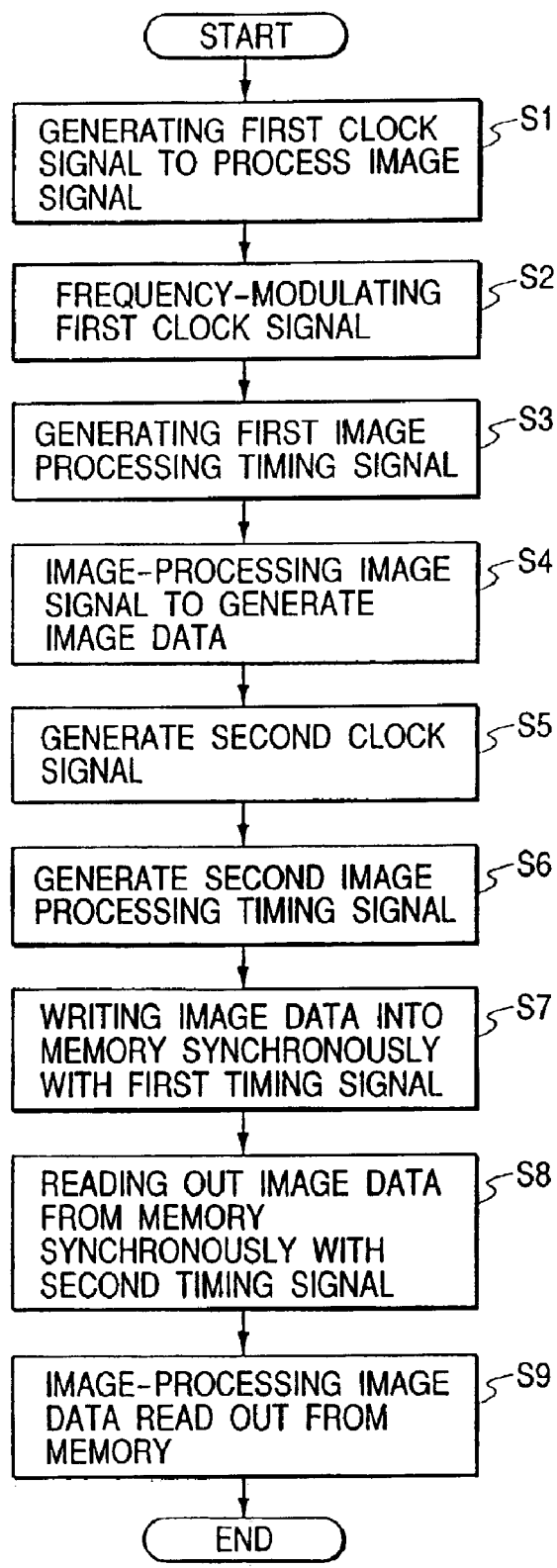
FIG. 10 is a flow chart illustrating an image processing operation.

Next, an example of the image processing method described above will be described with reference to the flow chart shown in FIG. 10. As shown in FIG. 10, first at Step S1, a first clock signal for processing an image signal is generated.

Next at Step S2, the first clock signal generated at the clock generating step S1 is frequency-modulated.

Next at Step S3, in accordance with the first clock signal frequency-modulated at the frequency modulation step S2, a first image processing timing signal is generated.

Next at Step S4, synchronously with the first image processing timing signal generated at the timing signal generation step S3, the image signal is processed to generate image data.

Next at Step S5, a second clock signal is generated.

Next at Step S6, in accordance with the second clock signal generated at Step S5, a second image processing timing signal is generated.

Next at Step S7, image data is written in the image memory 108 synchronously with the first timing signal generated at the first timing signal generating Step.

Next at Step S8, the image data written in the image memory 108 is read synchronously with the second timing signal generated at Step S6.

Next at Step S9, the image data read from the image memory 108 is subjected to predetermined image processing.

The read/write process for the image memory 108 may be executed at a desired image processing position before to the data output to the laser driver circuit 116, as described previously.

As described so far, the clock signal synchronizing with image data is frequency-modulated and the image data is written in a memory synchronously with the frequency-modulated clock signal, whereas the image data written in the memory is read synchronously with the clock signal having a fixed frequency without frequency modulation. It is therefore possible to convert the image data stored in the memory synchronously with the frequency-modulated clock signal, into the image data synchronizing with the clock signal having a fixed frequency. Accordingly, the frequency of the clock signal can be modulated without the problem that the size of each dot becomes different on the side of a recording apparatus such as a printer. Radiation noises of an image processing apparatus can therefore be dealt with easily more than a conventional case.

Figure 11:
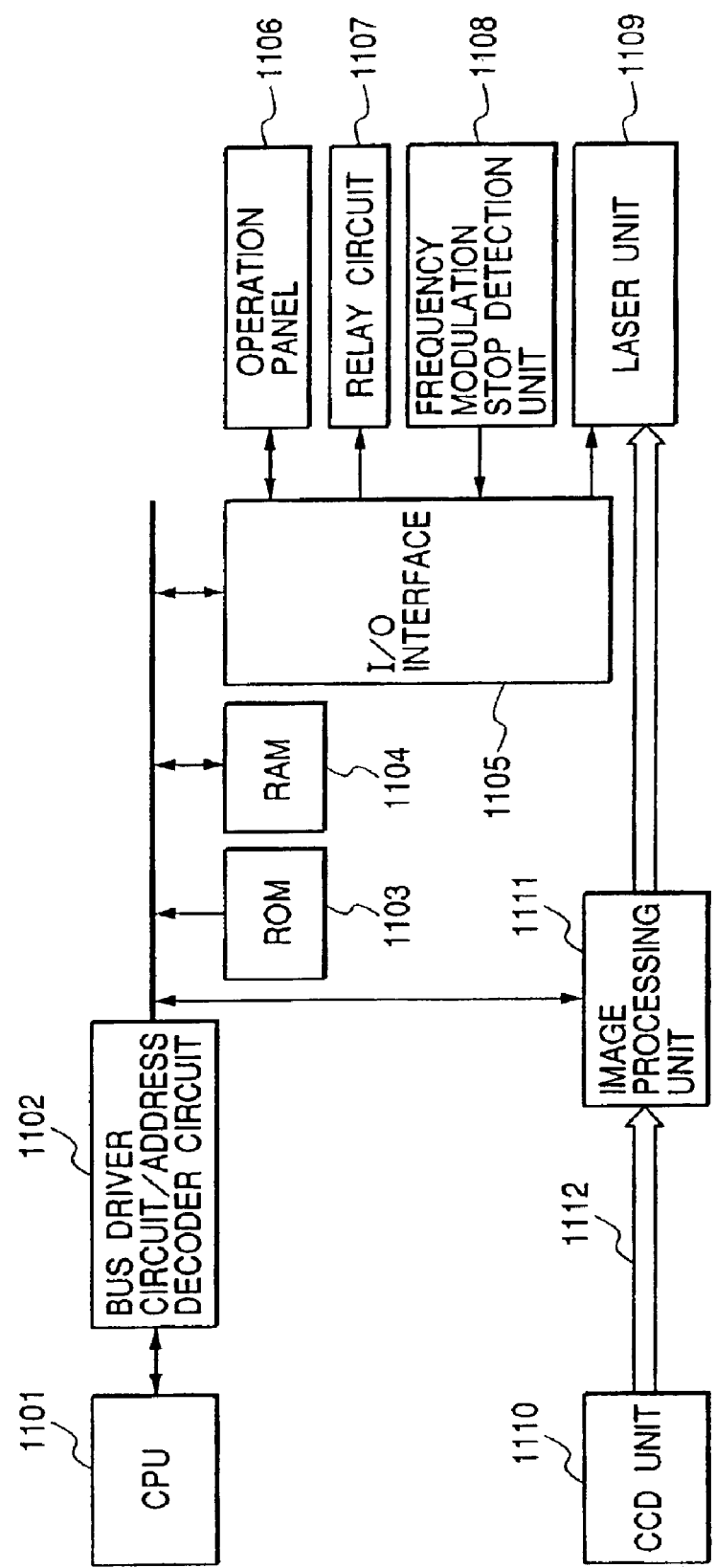
FIG. 11 is a block diagram showing the structure of an image processing apparatus according to another embodiment.

FIG. 11 is a block diagram showing the structure of an image processing apparatus according to another embodiment. The image processing apparatus of this embodiment has a CPU 1101, a bus drive circuit/address decoder circuit 1102, a read-only memory (ROM) 1103, a main memory (RAM) 1104, an I/O interface 1105, an operation panel 1106, a relay circuit 1107, a frequency modulation stop detection unit 1108, a laser unit 1109, a charge-coupled device (CCD) unit 1110, an image processing unit 1111, and a video bus 1112.

The structure of each element will be detailed. CPU (central processing unit) 1101 controls the entirety of the image processing apparatus, sequentially reads control programs from ROM 1103 to execute the processes illustrated in the flow chart of FIG. 15 and other processes. The bus driver circuit/address decoder circuit 1102 connects address and data buses of CPU 1101 to each load. ROM 1103 stores therein a control procedure (control programs) of the image processing apparatus. RAM (random access memory) 1104, which is a main memory device, is used as a storage area of input data or a working area of data. The I/O interface 1105 is connected to: the operation panel 1106; devices (not shown) including motors, clutches, solenoids for driving a paper feed system, a transport system and an optical system, and paper detecting sensors for detecting a transported paper sheet; and to respective loads of the relay circuit 1107, frequency modulation stop detection unit 1108 and laser unit 1109.

The operation panel 1106 includes various keys for entering data by an operator and a display unit such as a liquid crystal display and an LED for displaying the operation state and the like of the image processing apparatus. The relay circuit 1107 turns on and off a power of the image processing circuit. The frequency modulation stop detection unit 1108 detects a presence/absence of a frequency modulation stop (a failure of a frequency modulation unit 202 shown in FIG. 12) to be described later. The CCD unit 1110 reads image data from an original placed on an original support and outputs it via the video bus 1112 to the image processing unit 1111. The image processing unit 1111 performs image processing to be described later for the image data output from the CCD unit 1110. The video bus 1112 connects the CCD unit 1110 to the image processing unit 1111. The laser unit 1109 forms an image on a sheet in accordance with image data supplied from the image processing unit 1111. The frequency modulation stop detection unit 1108 and CCD unit 1110 will be detailed with reference to FIG. 12.

Figure 12:
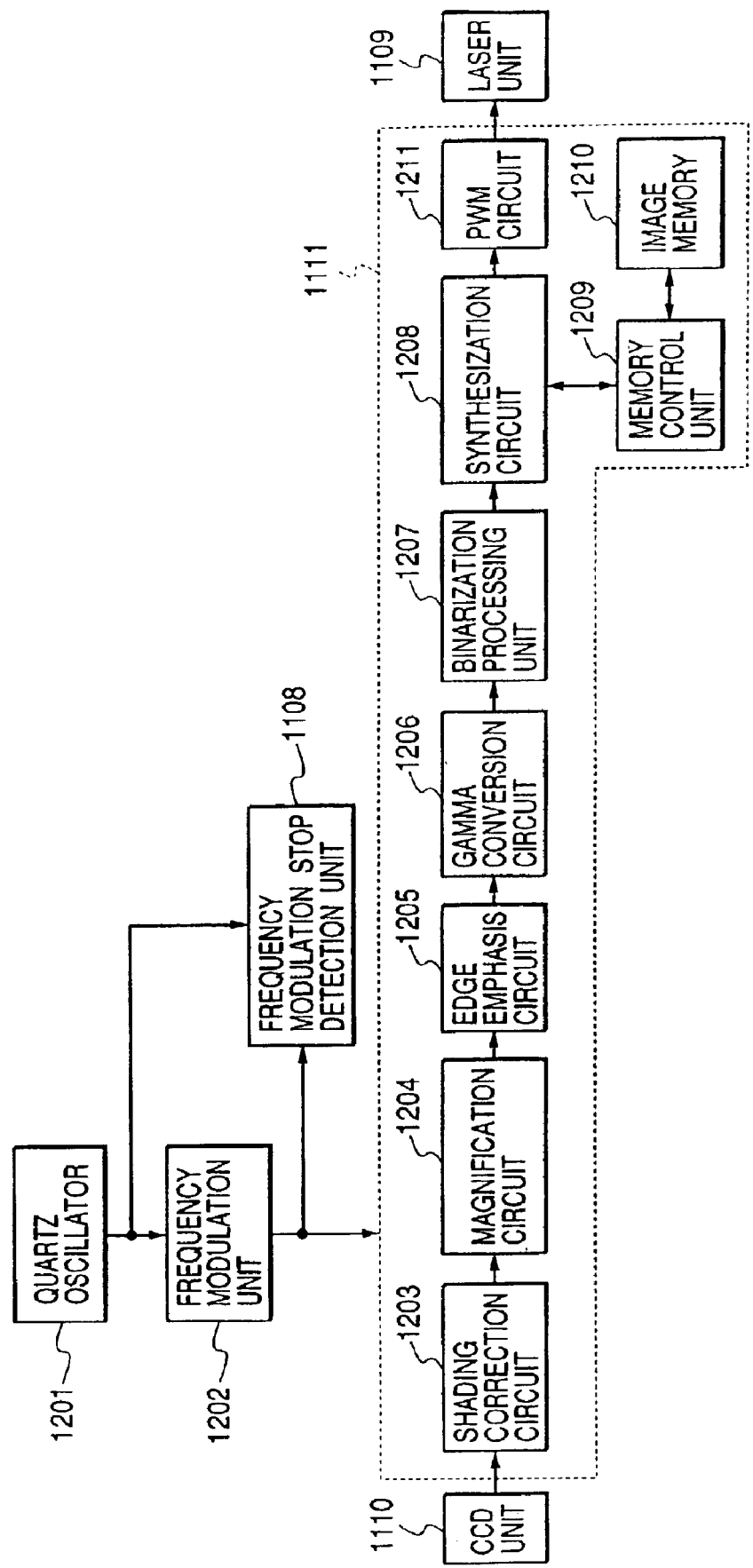
FIG. 12 is a block diagram showing the image processing apparatus of the embodiment, mainly its image processing unit.

FIG. 12 is a circuit block diagram of the image forming apparatus, mainly the image processing unit 1111 thereof. The image processing unit 1111 of the image processing apparatus of this embodiment has a shading correction circuit 1203, a magnification circuit 1204, an edge emphasis circuit 1205, a gamma conversion circuit 1206, a binarization processing unit 1207, a synthesization circuit 1208, a memory control unit 1209, an image memory 1210, and a pulse width modulation (PWM) circuit 1211. In FIG. 12, reference numeral 1201 represents a quartz oscillator, and reference numeral 1202 represents a frequency modulation unit.

The structure and operation of each element will be detailed. The quartz oscillator 1201 outputs a clock signal having a fixed frequency. The frequency modulation unit 1202 is input with the clock signal supplied from the quartz oscillator 1201 and outputs a clock signal whose frequency was modulated. This frequency modulation will be later detailed. The frequency modulation stop detection unit 1108 is input with the clock signal from the quartz oscillator 1201 and the clock signal from the frequency modulation unit 1202, and outputs a modulation stop detection signal when the clock signal input from the frequency modulation unit 1202 was not modulated.

The CCD unit 1110 is constituted of a focussing lens (not shown) for focussing light reflected from an original, an image pickup device (not shown) such as a CCD, a CCD driver (not shown) for driving the image pickup device in accordance with the clock signal output from the frequency modulation unit 1202, and other elements. An image signal from the image pickup device is converted into digital data of, for example, 8 bits, and input to the shading correction circuit 1203 of the image processing unit 1111, as an image data signal synchronizing with the frequency-modulated clock signal.

The image data signal input to the image processing unit 1111 is subjected to pixel variation correction at the shading correction circuit 1203. In the magnification circuit 1204, a data thinning process is executed for a reduction copy, whereas a data interpolating process is executed for an enlargement copy. Next in the edge emphasis circuit 1205, edges of an image are emphasized through second order differentiation in a window of, for example, 5×5 pixels. Since the image data is luminance data, the image data is converted, for example, into density data in order to print it out at the laser unit 1109 (printer), by the gamma conversion circuit 1206 by using a table. The image data converted into density data is then input to the binarization processing unit 1207 whereat multi-value data is converted into binary data, for example, by an ED (error diffusion) method. The binarized image data is input to the synthesization circuit 1208.

The synthesization circuit 1208 selectively outputs either the image data input from the binarization circuit 1207 or the image data input from the image memory 1210 such as a DRAM and a hard disk via the memory control unit 1209 which controls the data read/write of the image memory 1210. For example, if an image is to be rotated, it is rotated by controlling the read addresses of image data in the image memory 1210. The image data is input to the PWM circuit 1211 whereat it is converted into a signal corresponding to a radiation intensity of a laser beam so that a signal having a pulse width corresponding to the image density is output to the laser unit 1109. A series of image processing descried above is performed synchronously with the frequency-modulated clock signal.

Next, the details of the frequency modulation unit 1202 and frequency modulation stop detection unit 1108 of the image processing apparatus of this embodiment will be given. Frequency modulation is one of techniques for modulating in a narrow band a clock signal having a fixed frequency to thereby reduce electromagnetic radiation of the fixed frequency. For example, refer to U.S. Pat. No. 5,488,627 and U.S. Pat. No. 5,631,920.

FIG. 13 is a circuit diagram of the frequency modulation stop detection unit 1108 of the image processing apparatus of this embodiment. The frequency modulation stop detection unit 1108 has a phase comparator 1301 made of, for example, an EX-OR gate, a filter 1302 made of, for example, a resistor and a capacitor, and a comparator 1303. The phase comparator 1301 compares an output of the quartz oscillator 1202 with an output of the frequency modulation unit 1202. The filter 1302 integrates an output of the phase comparator 1301. The comparator 1303 compares an output of the filter 1302 with a reference voltage and outputs a modulation stop detection signal to the I/O interface 1105 depending upon the comparison result. FIG. 14A shows an output of the quartz oscillator 1201, FIG. 14B shows an output of the frequency modulation unit 1202, FIG. 14C shows an output of the phase comparator 1301, and FIG. 14D shows an output of the filter 1302.

Next, a frequency modulation stop operation to be executed by the image processing apparatus constructed as above according to the embodiment of the invention will be described with reference to FIGS. 11 to 14D and the flow chart of FIG. 15.

The clock signal (FIG. 14A) output from the quartz oscillator 1201 and the clock signal (FIG. 14B) output from the frequency modulation unit 1202 are input to the phase comparator 1301 of the frequency modulation stop detection unit 1108. If these clock signals have the waveforms shown in FIGS. 14A and 14B, an output signal of the phase comparator 1301 has the waveform shown in FIG. 14C. The output signal of the phase comparator 1301 is integrated by the filter 1302 and becomes the signal shown in FIG. 14D. The voltage level of this signal shown in FIG. 14D is represented by V1. If the frequency modulation unit 1202 is defective and the clock signal is not modulated, the phases of the clock signals input to the phase comparator 1301 are equal so that V1 is 0 V.

The comparator 1303 compares the voltage level V1 with a predetermined reference voltage $V_{REF}$ 1304, and outputs a high level signal if $V_{REF} \geq V1$. If $V_{REF}$ is set to a value very near to 0 V, the modulation stop detection signal takes the high level when the frequency modulation unit 1202 becomes defective, and this high level signal is supplied to CPU 1101 via the I/O interface 1105.

FIG. 15 is a flow chart illustrating a control operation to be executed by the image processing apparatus when a frequency modulation stop is detected. When the high level modulation stop detection signal is supplied from the frequency modulation stop detection unit 1108 to CPU 1101 via the I/O interface 1105 (Step S501), CPU 1101 operates via the I/O interface 1105 to display an alarm on an unrepresented display (e.g., liquid crystal display) on the operation panel 1106 (Step S502). CPU 1101 also backs up the error contents in RAM 1104 (Step S503) and thereafter turns off the relay circuit 1107 via the I/O interface 1105 to turn off the power of the image processing apparatus.

As described so far, the image processing apparatus of this embodiment has: the quartz oscillator 1201 for generating a clock signal; frequency modulation unit 1202 for modulating the frequency of the clock signal output from the quartz oscillator 1201; image processing unit 1111 for processing image data synchronously with the clock signal modulated by the frequency modulation unit 1202; frequency modulation stop detection unit 1108 including the phase comparator 1301 for comparing an output of the quartz oscillator 1201 with an output of the frequency modulation unit 1202, filter 1302 for integrating an output of the phase comparator 1301 and comparator 1303 for supplying a modulation stop detection signal to CPU 1101 when an output of the filter 1302 is equal to or lower than $V_{REF}$; and CPU 1101 which operates to display an alarm on a display on the operation panel 1106 and turn off the relay circuit 1107 to turn off the power of the image processing apparatus. The image processing apparatus therefore has the following advantageous effects.

In the image processing apparatus having the above-described structure, the phase comparator 1301 of the frequency modulation stop detection unit 1108 compares both outputs of the quartz oscillator 1201 and frequency modulation unit 1202 and supplies the filter 1303 with an output signal in conformity with the comparison result. The filter 1302 integrates an output of the phase comparator 1301 and outputs the integrated signal to the comparator 1303. If the output of the filter 1302 is equal to or lower than $V_{REF}$, the comparator 1303 supplies CPU 1101 with a modulation stop detection signal. Upon reception of the modulation stop detection signal, CPU 1101 operates to display an alarm on a display unit on the operation panel 1106 and turn off the relay circuit to turn off the power of the image processing apparatus.

In this embodiment, therefore, the image processing apparatus can reduce electromagnetic radiation easily and with low cost. In addition, it is effective that electromagnetic noises can be prevented from increasing and adversely affecting other apparatuses, when the frequency modulation function stops.

In the image processing apparatus of this embodiment, when the frequency modulation stop detection unit 1108 detects a stop of the modulation function of the frequency modulation unit 1202, CPU 1101 operates to display an alarm on a display on the operation panel 1106. The embodiment is not limited only thereto. For example, the image processing unit may be provided with a sound output unit, and CPU 1101 operates to produce alarm sounds from the sound output unit.

Figure 16:
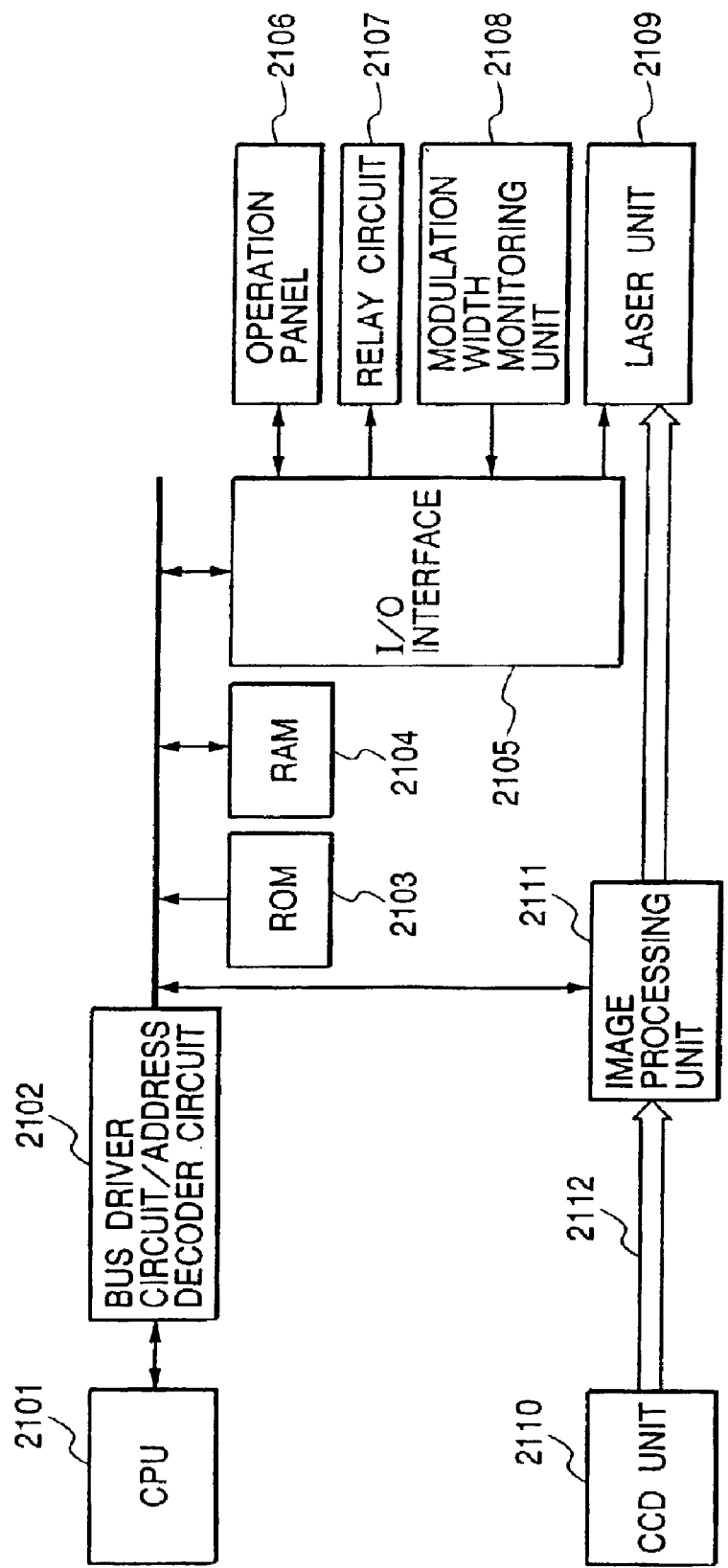
FIG. 16 is a block diagram showing the structure of an image processing apparatus according to another embodiment.

FIG. 16 is a block diagram showing the structure of an image processing apparatus according to another embodiment. The image processing apparatus of this embodiment has a CPU 2101, a bus drive circuit/address decoder circuit 2102, a read-only memory (ROM) 2103, a main memory (RAM) 2104, an I/O interface 2105, an operation panel 2106, a relay circuit 2107, a modulation width monitoring unit 1108, a laser unit 2109, a charge-coupled device (CCD) unit 2110, an image processing unit 2111, and a video bus 2112.

The structure of each element will be detailed. CPU (central processing unit) 2101 controls the entirety of the image processing apparatus, sequentially reads control programs from ROM 2103 to execute the processes illustrated in the flow chart of FIG. 20 and other processes. The bus driver circuit/address decoder circuit 2102 connects address and data buses of CPU 2101 to each load. ROM 2103 stores therein a control procedure (control programs) of the image processing apparatus. RAM (random access memory) 2104 is used as a storage area of input data or a working area of data. The I/O interface 2105 is connected to: the operation panel 2106; devices (not shown) including motors, clutches, solenoids for driving a paper feed system, a transport system and an optical system, and paper detecting sensors for detecting a transported paper sheet; and to respective loads of the relay circuit 2107, modulation width monitoring unit 2108 and laser unit 2109.

The operation panel 2106 includes various keys for entering data by an operator and a display unit such as a liquid crystal display and an LED for displaying the operation state and the like of the image processing apparatus. The relay circuit 2107 turns on and off a power of the image processing circuit. The modulation width monitoring unit 2108 monitors a modulation width of a modulated clock in the manner to be described later. The CCD unit 2110 reads image data from an original placed on an original support and outputs it via the video bus 2112 to the image processing unit 2111. The image processing unit 2111 performs image processing to be described later for the image data output from the CCD unit 2110. The video bus 2112 connects the CCD unit 2110 to the image processing unit 2111. The laser unit 2109 forms an image on a sheet in accordance with image data supplied from the image processing unit 2111. The modulation width monitoring unit 2108 and CCD unit 2110 will be detailed with reference to FIG. 17.

Figure 17:
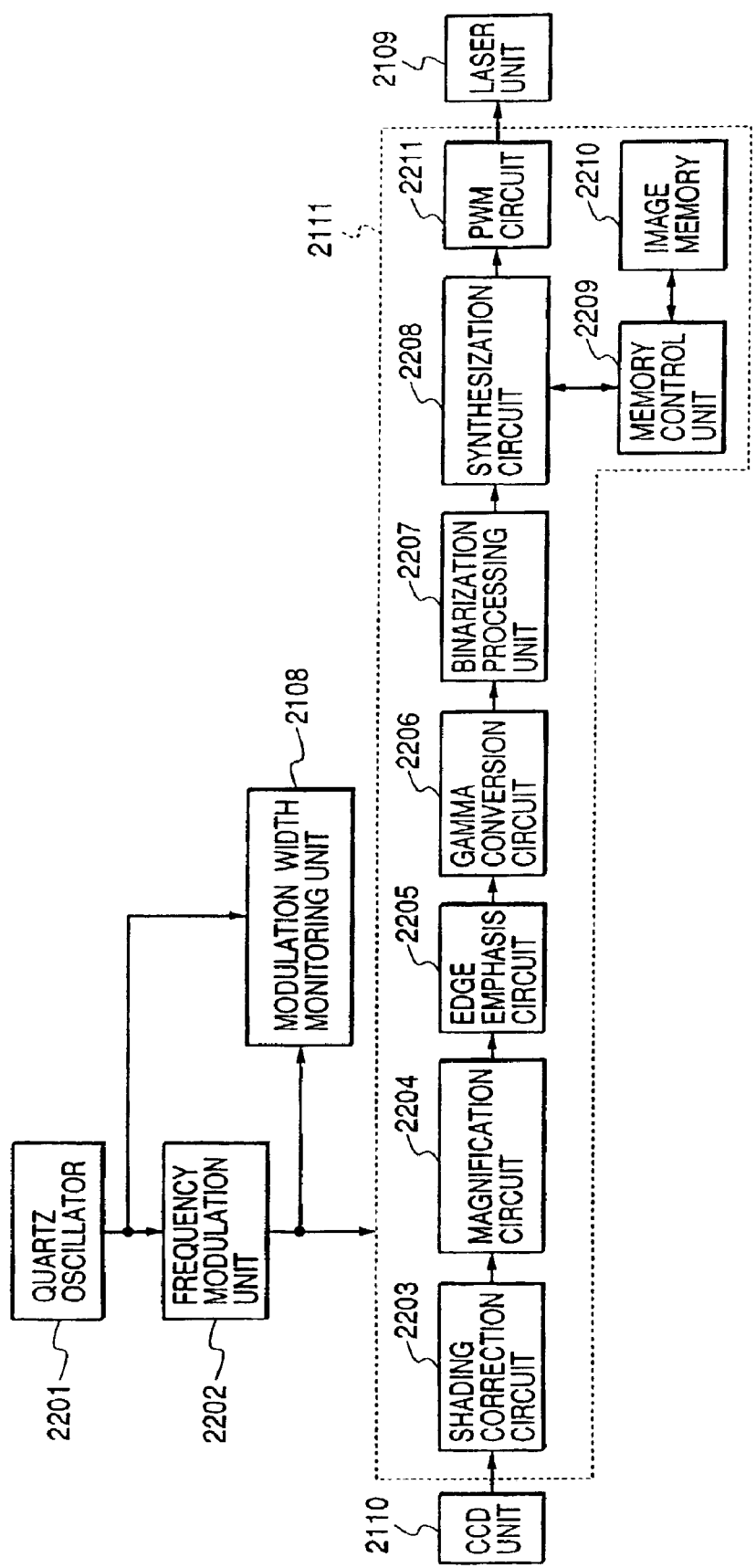
FIG. 17 is a block diagram showing the image processing apparatus of the embodiment, mainly its image processing unit.

FIG. 17 is a circuit block diagram of the image forming apparatus, mainly the image processing unit 2111 thereof. The image processing unit 2111 of the image processing apparatus of this embodiment has a shading correction circuit 2203, a magnification circuit 2204, an edge emphasis circuit 2205, a gamma conversion circuit 2206, a binarization processing unit 2207, a synthesization circuit 2208, a memory control unit 2209, an image memory 2210, and a pulse width modulation (PWM) circuit 2211. In FIG. 17, reference numeral 2201 represents a quartz oscillator, and reference numeral 2202 represents a frequency modulation unit.

The structure and operation of each element will be detailed. The quartz oscillator 2201 outputs a clock signal having a fixed frequency. The frequency modulation unit 2202 is input with the clock signal supplied from the quartz oscillator 2201 and outputs a clock signal whose frequency was modulated. This frequency modulation will be later detailed. The modulation width monitoring unit 2108 is input with the clock signal from the quartz oscillator 2201 and the clock signal from the frequency modulation unit 2202, and outputs a modulation width detection signal when the modulation width of the input clock signal shifts from a reference value.

The CCD unit 2110 is constituted of a focussing lens (not shown) for focussing light reflected from an original, an image pickup device (not shown) such as a CCD, a CCD driver (not shown) for driving the image pickup device in accordance with the clock signal output from the frequency modulation unit 2202, and other elements. An image signal from the image pickup device is converted into digital data of, for example, 8 bits, and input to the shading correction circuit 2203 of the image processing unit 2111, as an image data signal synchronizing with the frequency-modulated clock signal.

The image data signal input to the image processing unit 2111 is subjected to pixel variation correction at the shading correction circuit 2203. In the magnification circuit 2204, a data thinning process is executed for a reduction copy, whereas a data interpolating process is executed for an enlargement copy. Next in the edge emphasis circuit 2205, edges of an image are emphasized through second order differentiation in a window of, for example, 5×5 pixels. Since the image data is luminance data, the image data is converted, for example, into density data in order to print it out at the laser unit 2109 (printer), by the gamma conversion circuit 2206 by using a table. The image data converted into density data is then input to the binarization processing unit 2207 whereat multi-value data is converted into binary data, for example, by an ED (error diffusion) method. The binarized image data is input to the synthesization circuit 2208.

The synthesization circuit 2208 selectively outputs either the image data input from the binarization circuit 1207 or the image data input from the image memory 2210 such as a DRAM and a hard disk via the memory control unit 2209 which controls the data read/write of the image memory 2210. For example, if an image is to be rotated, it is rotated by controlling the read addresses of image data in the image memory 2210. The image data is input to the PWM circuit 2211 whereat it is converted into a signal corresponding to a radiation intensity of a laser beam so that a signal having a pulse width corresponding to the image density is output to the laser unit 2109. A series of image processing descried above is performed synchronously with the frequency-modulated clock signal.

Next, the details of the frequency modulation unit 2202 and modulation width monitoring unit 2108 of the image processing apparatus of this embodiment will be given. Frequency modulation is one of techniques for modulating in a narrow band a clock signal having a fixed frequency to thereby reduce electromagnetic radiation of the fixed frequency. For example, refer to U.S. Pat. No. 5,488,627 and U.S. Pat. No. 5,631,920.

Figures 18, 19A, 19B, 19C, 19D:
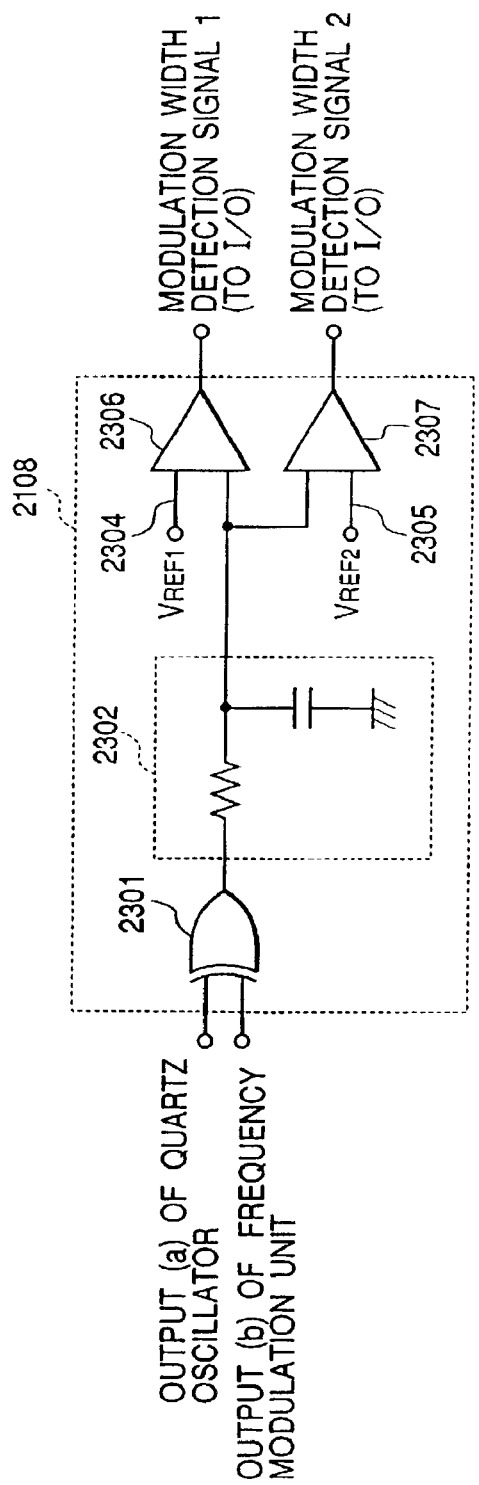
FIG. 18 is a circuit diagram of a modulation width monitoring unit of the image processing apparatus shown in FIG. 16.
FIGS. 19A, 19B, 19C and 19D show the waveforms of signals at the modulation width monitoring unit of the image processing apparatus shown in FIG. 16.

FIG. 18 is a circuit diagram of the modulation width monitoring unit 2108 of the image processing apparatus of this embodiment. The modulation width monitoring unit 2108 has a phase comparator 2301 made of, for example, an EX-OR gate, a filter 2302 made of, for example, a resistor and a capacitor, and comparators 2306 and 2307. The phase comparator 2301 compares an output of the quartz oscillator 2202 with an output of the frequency modulation unit 2202. The filter 2302 integrates an output of the phase comparator 2301. The comparator 2306 compares an output of the filter 2302 with a lowest reference voltage and outputs a modulation width detection signal 1 to the I/O interface 2105 depending upon the comparison result. The comparator 2307 compares an output of the filter 2302 with a highest reference voltage and outputs a modulation width detection signal 2 to the I/O interface 2105 depending upon the comparison result. FIG. 19A shows an output of the quartz oscillator 2201, FIG. 19B shows an output of the frequency modulation unit 2202, FIG. 19C shows an output of the phase comparator 2301, and FIG. 19D shows an output of the filter 2302.

Next, a modulation width monitoring operation to be executed by the image processing apparatus constructed as above according to the embodiment of the invention will be described with reference to FIGS. 16 to 19D and the flow chart of FIG. 20.

The clock signal (FIG. 19A) output from the quartz oscillator 2201 and the clock signal (FIG. 19B) output from the frequency modulation unit 2202 are input to the phase comparator 2301 of the modulation width monitoring unit 2108. If these clock signals have the waveforms shown in FIGS. 19A and 19B, an output signal of the phase comparator 2301 has the waveform shown in FIG. 19C. The output signal of the phase comparator 2301 is integrated by the filter 2302 and becomes the signal shown in FIG. 19D. The voltage level of this signal shown in FIG. 19D is represented by V1. If the modulation width becomes large, the potential level V1 becomes high, whereas if the modulation width becomes small, the potential level V1 becomes low.

A potential level 2304 corresponding to an allowable minimum modulation width of the image processing apparatus is represented by $V_{REF1}$, and a potential level 2305 corresponding to an allowable maximum modulation width of the image processing apparatus is represented by $V_{REF2}$. The comparator 2306 compares the voltage level V1 with $V_{REF1}$, and the comparator 2307 compares the voltage level V1 with $V_{REF2}$. If $V_{REF1} > V1$ or $V_{REF2} < V1$, the modulation width detection signal 1 or 2 takes the high level and is supplied via the I/O interface 2105 to CPU 2101.

Figure 20:
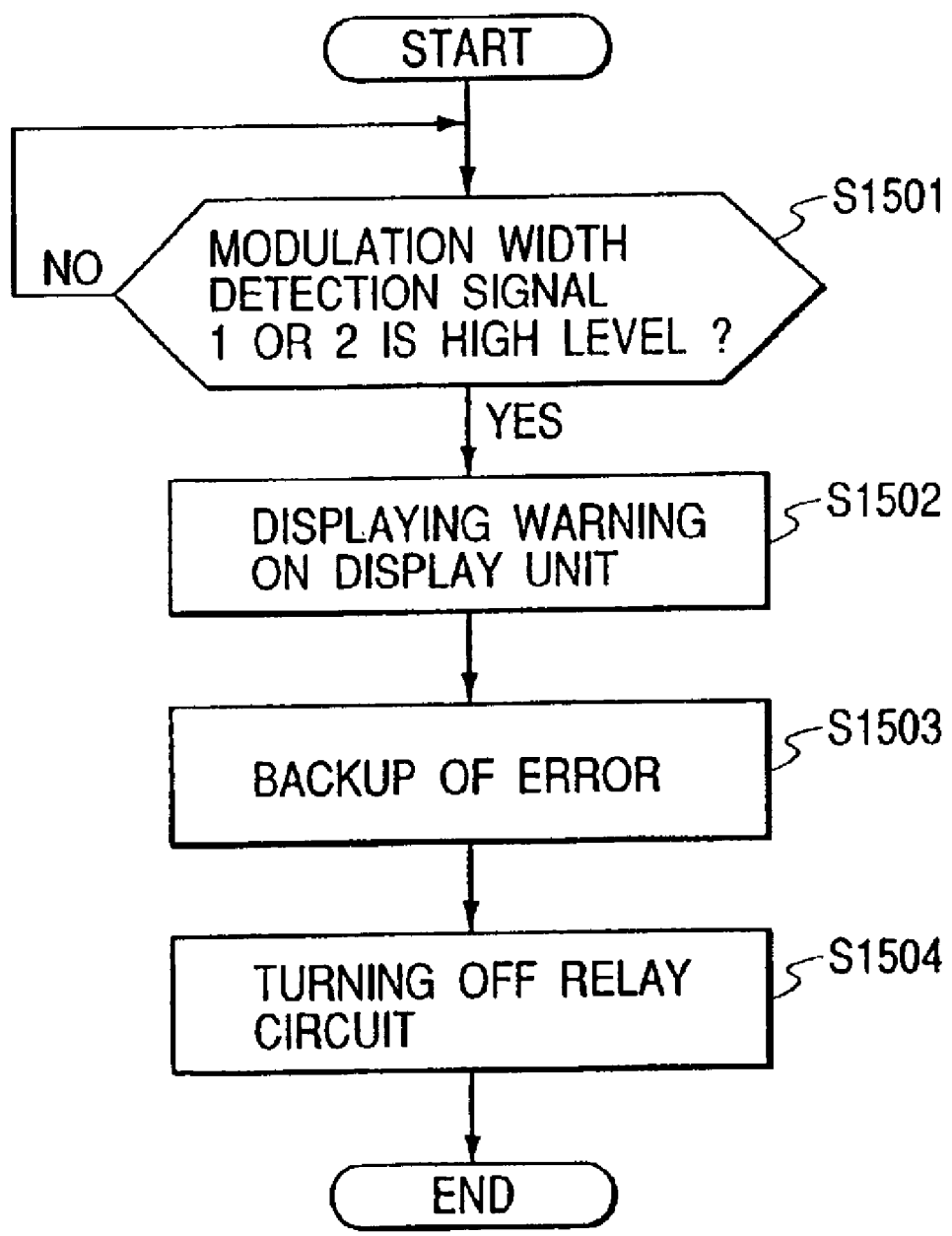
FIG. 20 is a flow chart illustrating a modulation width monitoring operation to be executed by the image processing apparatus shown in FIG. 16.

FIG. 20 is a flow chart illustrating a control operation to be executed by the image processing apparatus when a shift of the modulation width out of a reference range is detected. When the high level modulation width detection signal is supplied from the modulation width monitoring unit 2108 to CPU 2101 via the I/O interface 2105 (Step S1501), CPU 2101 operates via the I/O interface 2105 to display an alarm on an unrepresented display (e.g., liquid crystal display) on the operation panel 2106 (Step S1502). CPU 2101 also backs up the error contents in RAM 2104 (Step S103) and thereafter turns off the relay circuit 2107 via the I/O interface 2105 to turn off the power of the image processing apparatus.

As described so far, the image processing apparatus of this embodiment has: the quartz oscillator 2201 for generating a clock signal; frequency modulation unit 2202 for modulating the frequency of the clock signal output from the quartz oscillator 2201; image processing unit 2111 for processing image data synchronously with the clock signal modulated by the frequency modulation unit 2202; modulation width monitoring unit 2108 including the phase comparator 2301 for comparing an output of the quartz oscillator 2201 with an output of the frequency modulation unit 2202, filter 2302 for integrating an output of the phase comparator 2301, comparator 2306 for supplying the modulation width detection signal 1 to CPU 1101 when an output of the filter 2302 is smaller than $V_{REF1}$, and comparator 2307 for supplying the modulation width detection signal 2 to CPU 1101 when an output of the filter 2302 is larger than $V_{REF2}$; and CPU 2101 which operates to display an alarm on a display on the operation panel 2106 and turn off the relay circuit 2107 to turn off the power of the image processing apparatus. The image processing apparatus therefore has the following advantageous effects.

In the image processing apparatus having the above-described structure, the phase comparator 2301 of the frequency modulation stop detection unit 2108 compares both outputs of the quartz oscillator 2201 and frequency modulation unit 2202 and supplies the filter 2303 with an output signal in conformity with the comparison result. The filter 2302 integrates an output of the phase comparator 2301 and outputs the integrated signal to the comparators 2306 and 2307. If the output of the filter 2302 is lower than $V_{REF1}$, the comparator 2306 supplies CPU 2101 with the modulation width detection signal 1, whereas if the output of the filter 2302 is higher than $V_{REF2}$, the comparator 2307 supplies CPU 2101 with the modulation width detection signal 2. Upon reception of the modulation width detection signal, CPU 2101 operates to display an alarm on a display unit on the operation panel 2106 and turn off the relay circuit to turn off the power of the image processing apparatus.

In this embodiment, therefore, the image processing apparatus can reduce electromagnetic radiation easily and with low cost. In addition, it is effective that electromagnetic noises can be prevented from increasing and adversely affecting other apparatuses, when the frequency modulation function stops.

In the image processing apparatus of this embodiment, when the modulation width monitoring unit 2108 detects a shift of the modulation width out of a reference range, CPU 2101 operates to display an alarm on a display on the operation panel 2106. The embodiment is not limited only thereto. For example, the image processing unit may be provided with a sound output unit, and CPU 2101 operates to produce alarm sounds from the sound output unit.

The present invention may be applied to a system constituted of a plurality of apparatuses (e.g., a host computer, interface units, a reader, a printer, and the like) or to a system constituted of a single apparatus (e.g., a copier or a fax). The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention.

The storage medium storing such program codes may be a floppy disk, a hard disk, an optical disk, a magneto-optical disk, a CD-ROM, a CD-R, a magnetic tape, a non-volatile memory card, a ROM, and the like.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

The invention has been described in connection with the above preferred embodiments. The invention is not limited only to the above embodiments, but various modification are possible without departing from the scope of the appended claims.

What is claimed is:

1. An image processing apparatus comprising:
   a clock signal generation circuit adapted to generate a clock signal;
   a frequency modulation circuit adapted to modulate a frequency of a generated clock signal; and
   a detection circuit adapted to detect an operation state of said frequency modulation circuit in accordance with a comparison result between an output of said clock signal generating circuit and an output of said frequency modulation circuit,
   wherein said detection circuit detects a stopping of a modulation function of said frequency modulation circuit when the comparison result between an output of said clock signal generation circuit and an output of said frequency modulation circuit indicates a value equal to or lower than a reference value.

2. An image processing apparatus according to claim 1, further comprising a control circuit adapted to turn off a power of the image processing apparatus when said detection circuit detects a stopping of the modulation function of said frequency modulation circuit.

3. An image processing apparatus according to claim 1, further comprising an alarm adapted to issue an alarm when said detection circuit detects a stopping of the modulation function of said frequency modulation circuit.

4. An image processing apparatus comprising:
   a clock signal generation circuit adapted to generate a clock signal;
   a frequency modulation circuit adapted to modulate a frequency of the generated clock signal; and
   a detection circuit adapted to detect whether a modulation width of the frequency-modulated clock signal is outside of a reference range.

5. An image processing apparatus according to claim 4, wherein said detection circuit detects whether the modulation width is outside of the reference range in accordance with a comparison result between an output of said clock signal generation circuit and an output of said frequency modulation circuit.

6. An image processing apparatus according to claim 5, wherein said detection circuit determines that the modulation width is outside of the reference range when the comparison result between an output of said clock signal generation circuit and an output of said frequency modulation circuit is smaller than a minimum reference value or larger than a maximum reference value.

7. An image processing apparatus according to claim 6, further comprising a control circuit adapted to turn off a power of the image processing apparatus when said detection circuit detects that the modulation width of said frequency modulation circuit is outside of the reference range.

8. An image processing apparatus according to claim 6, further comprising an alarm adapted to issue an alarm when said detection circuit detects that the modulation width of said frequency modulation circuit is outside of the reference range.

9. An image processing method comprising:
   generating a clock signal;
   modulating a frequency of a generated clock signal; and
   detecting an operation state of frequency modulation in accordance with a comparison result between an output of said generating clock signal and an output of said frequency modulating,
   wherein said detecting the operation state includes detecting a stopping of a modulation function of said frequency modulation when the comparison result between an output of said generating the clock signal and an output of said frequency modulating indicates a value equal to or lower than a reference value.

10. An image processing method according to claim 9, further comprising the step of turning off a power of an image processing apparatus when a stopping of the frequency modulation function is detected in said detecting step.

11. An image processing method according to claim 9, further comprising the step of issuing an alarm when a stopping of the frequency modulation function is detected in said detecting step.

12. An image processing method comprising:
generating a clock signal;
modulating a frequency of the generated clock signal; and
detecting whether a modulation width of the frequency-modulated clock signal is outside of a reference range.

13. An image processing method according to claim 12, wherein said detecting the modulation width includes detecting whether a modulation width is outside of the reference range in accordance with a comparison result between a clock signal generated in said generating step and a clock signal modulated in said frequency modulating step.

14. An image processing method according to claim 13, wherein said detecting step includes detecting that the modulation width is outside of the reference range when the comparison result between the clock signal generated in said generating step and the clock signal modulated in said frequency modulating step is smaller than a minimum reference value or larger than a maximum reference value.

15. An image processing method according to claim 14, wherein said detecting step includes turning off power of an image processing apparatus when it is detected in said detecting step that the modulation width in said frequency modulation step is outside of the reference range.

16. An image processing method according to claim 14, wherein said detecting step includes issuing an alarm when it is detected in said detecting step that the modulation width in said frequency modulation step is outside of the reference range.

17. A storage medium storing a program for realizing an image processing method, the method comprising the steps of:
generating a clock signal;
modulating a frequency of a generated clock signal; and
detecting an operation state of frequency modulation in accordance with a comparison result between an output of the generating clock signal and an output of said frequency modulating step,
wherein said detecting step includes detecting a stopping of a modulation function of said frequency modulating when the comparison result between an output of said generating step and an output of said frequency modulating indicates a value equal to or lower than a reference value.

18. A storage medium according to claim 17, wherein said method further comprises the step of turning off power of an image processing apparatus when a stopping of the frequency modulation function is detected in said detecting step.

19. A storage medium according to claim 17, wherein said method further comprises the step of issuing an alarm when a stopping of the frequency modulation function is detected in said detecting step.

20. A storage medium storing a program for realizing an image processing method, the method comprising the steps of:
generating a clock signal;
modulating a frequency of the generated clock signal; and
detecting whether a modulation width of the frequency-modulated clock signal is outside of a reference range.

21. A storage medium according to claim 20, wherein said detecting step includes detecting whether the modulation width is outside of the reference range in accordance with a comparison result between a clock signal generated in said generating step and a clock signal modulated in said frequency modulating step.

22. A storage medium according to claim 21, wherein said detecting step includes detecting that the modulation width is outside of the reference range when the comparison result between the clock signal generated in said generating step and the clock signal modulated in said frequency modulating step is smaller than a minimum reference value or larger than a maximum reference value.

23. A storage medium according to claim 22, wherein said detecting step includes turning off power of an image processing apparatus when said it is detected in said detecting step that the modulation width in said frequency modulation step is outside of the reference range.

24. A storage medium according to claim 22 wherein said method further includes the step of issuing an alarm when it is detected in said detecting step that the modulation width in said frequency modulation step is outside of the reference range.

* * * * *

UNITED STATES PATENT AND TRADEMARK OFFICE
CERTIFICATE OF CORRECTION

PATENT NO. : 6,917,449 B2  
DATED : July 12, 2005  
INVENTOR(S) : Yasuki Nakajima et al.

It is certified that error appears in the above-identified patent and that said Letters Patent is hereby corrected as shown below:

Title page,  
Item [75], Inventors, "Yasuki Nakajima, Kanagawa-ken (JP); Hisatsugu Tahara, Kanagawa-ken (JP)" should read -- Yasuki Nakajima, Yokohama (JP); Hisatsugu Tahara, Kawasaki (JP) --.  
Item [30], Foreign Application Priority Data,  
"Nov. 17, 1998    (JP) ........ 10-326399" should read  
-- Nov. 17, 1998    (JP) ........ 10-326390 --.  
Item [56], References Cited, FOREIGN PATENT DOCUMENTS,  
"62146066" should read -- 62-146066 --;  
"JP 9322108 *    12/1997      H04N/5/907" should be deleted; and  
"JP 10065910    3/1998" should be deleted.

Column 1,  
Line 33, "hands," should read -- hand, --;  
Line 34, "noises" should read -- noise --;  
Line 37, "noises," should read -- noise --; and  
Lines 41 and 44, "noises," should read -- noise, --.

Column 6,  
Line 23, "noises" should read -- noise --.

Signed and Sealed this

Ninth Day of May, 2006

JON W. DUDAS  
*Director of the United States Patent and Trademark Office*